United States Patent
Veerathappa et al.

(10) Patent No.: US 8,783,232 B2
(45) Date of Patent: Jul. 22, 2014

(54) STRATIFIED TWO-STROKE ENGINE AND DUAL PASSAGE FUEL SYSTEM

(75) Inventors: Jay S. Veerathappa, Los Angeles, CA (US); Nagesh S. Mavinahally, Northridge, CA (US)

(73) Assignee: Nagesh S Mavinahally, Granada Hills, CA (US)

( * ) Notice: Subject to any disclaimer, the term of this patent is extended or adjusted under 35 U.S.C. 154(b) by 259 days.

(21) Appl. No.: 13/425,417

(22) Filed: Mar. 21, 2012

(65) Prior Publication Data
US 2012/0247435 A1 Oct. 4, 2012

Related U.S. Application Data

(60) Provisional application No. 61/471,182, filed on Apr. 3, 2011, provisional application No. 61/494,417, filed on Jun. 8, 2011.

(51) Int. Cl.
- *F02B 45/00* (2006.01)
- *F02M 13/08* (2006.01)
- *F02M 21/04* (2006.01)
- *F02M 17/04* (2006.01)
- *F02M 7/22* (2006.01)

(52) U.S. Cl.
CPC ............. *F02M 21/042* (2013.01); *F02M 13/08* (2013.01); *F02M 17/04* (2013.01); *F02M 7/225* (2013.01); *Y02T 10/32* (2013.01)
USPC .......... 123/527; 123/65 P; 123/525; 123/540; 261/16; 261/41.2; 48/116; 48/61

(58) Field of Classification Search
USPC .......... 123/65 P, 73 PP, 525, 438, 463, 196 R, 123/527; 48/116, 61; 261/16, 41.2, 41.3, 261/42, 34.1
See application file for complete search history.

(56) References Cited

U.S. PATENT DOCUMENTS

| | | | |
|---|---|---|---|
| 2,397,984 A * | 4/1946 | Schorn | 123/463 |
| 4,253,433 A | 3/1981 | Blair | |
| 5,918,574 A | 7/1999 | Kobayashi | |
| 6,101,991 A * | 8/2000 | Glover | 123/73 PP |
| 6,112,708 A | 9/2000 | Sawada et al. | |
| 6,273,037 B1 | 8/2001 | Cobb, Jr. | |
| 6,293,235 B1 | 9/2001 | Cobb, Jr. | |
| 6,640,755 B2 | 11/2003 | Araki | |
| 6,901,892 B2 | 6/2005 | Mavinahally et al. | |
| 2009/0308352 A1 | 12/2009 | Kojima et al. | |
| 2010/0101540 A1 | 4/2010 | Fujinuma et al. | |
| 2011/0220074 A1* | 9/2011 | Veerathappa | 123/65 P |

FOREIGN PATENT DOCUMENTS

JP 63309759 A * 12/1988

* cited by examiner

*Primary Examiner* — Noah Kamen
*Assistant Examiner* — Long T Tran
(74) *Attorney, Agent, or Firm* — Geoffrey Gelman

(57) ABSTRACT

Various embodiments include two-stroke stratified engines and dual passage carburetors for use with gaseous fuel, such as hydrogen, methane, liquid petroleum gas, pure propane, and butane. A stratified air-head engine and low pressure fuel injected engines with fuel only tube is included.

26 Claims, 18 Drawing Sheets

STRATIFIED TWO-STROKE ENGINE AND DUAL PASSAGE FUEL SYSTEM

RELATED APPLICATIONS

The present application claims the benefit of priority of U.S. provisional application Nos. 61/313,801, filed Mar. 14, 2010, entitled "STRATIFIED TWO-STROKE ENGINE AND FUEL SYSTEM", 61/471,182, filed Apr. 3, 2011, entitled "STRATIFIED TWO-STROKE ENGINE' and 61/494,417, filed Jun. 8, 2011, entitled "STRATIFIED TWO-STROKE ENGINE AND FUEL SYSTEM", the entirety of which is incorporated by reference herein for all purposes.

BACKGROUND

Conventional gasoline fueled four-stroke engine used in hand-held applications as in a trimmer and a blower sold by Ryobi and MTD and gaseous fueled blower by LEHR are environmentally friendly. However, the drawback is that those engines are very heavy and cannot be operated upside down for extended time and the same design cannot be used in chainsaws. Alternative two-stroke engines are advantageous, but very high in emission levels. Gaseous fueled two-stroke trimmer engine as manufactured and sold by Mitsubishi is a conventional two-stroke engine, which has significantly higher pollutants in the exhaust. Some conventional two-stroke engines sold in US have catalysts to lower the emission levels.

It is known in the engine industry that there are gaseous fueled two-stroke engines with oil injection system. However, these engines are conventional type which have high emission levels and the cleaner stratified engines are gasoline fueled and typically have oil pre-mixed with the gasoline. The disadvantage with gasoline fuel is that they smell bad when spilled and evaporate when stored for longer time. Secondly users have to always pre-mix oil for lubrication, which can harm the catalysts and as such emission levels may be bad toward the end of the life of the catalyst and or the engine. Thirdly, user may forget to mix oil with the gasoline which results in a scuffed engine.

The design described here has a gaseous fueled stratified two-stroke engine with a dual passage carburetor to lower the emissions and oil injection to lubricate the engine. The engine may further be fitted with catalysts to reduce the pollutants to even way below the legal limits. The gaseous fuel may be Butane, CNG, Methane, Hydrogen, or Propane or mixture of any gaseous fuels in any ratio. The engine can be used in many hand-held and lawn garden and mobile applications such as chainsaws, trimmers and scooters.

BRIEF SUMMARY

The new invention describes the designs of the new two-stroke engine and the carburetor for use with Gaseous fuel, like, H2, Methane, LPG, Pure propane, or Butane. The two-stroke engine is especially best for lawn and garden tools such as chainsaws, trimmers, blowers, pumps, and scooters.

The new invention reduces the emissions significantly with LPG or Butane as fuel and just water vapor and N2 and NOx when H2 is used.

Further, the inventions provide a new lubricating system where in the oil injection pump is driven by the crankshaft or belt or gear drive off of the crankshaft. Alternatively the oil pump may be a diaphragm pump with or without a plunger. The oil may be injected into the intake, particularly into the air-fuel mixture passage, or into the crankcase, and may also be injected into the transfer passage, particularly at the bottom of the passage in a stratified engine where air is drawn into the crankcase through the transfer passage. The gaseous fuel tank is attached to the bottom of the crankcase or at the top of the engine above the cylinder. The gaseous fuel tank may also be embedded inside the plastic housing on an engine, such as a chainsaw. There may be more than one fuel tank attached to the engine. The generator produced by Honda model EU9IGB has two LPG or Butane fuel canisters attached to the engine inside a plastic housing. A chainsaw which requires fuel to last longer, particularly when it is used on top of a tree, has advantage in having more than one fuel canister supplying fuel to the engine. Secondly an all attitude design for lubricating the engine would be advantageous, such having oil mixed in the air-fuel mixture.

Further the invention discloses a rotary valve controlled fuel injection system where the rotary valve opens and closes the crankcase port at the bottom end of the injection tube 38. The rotary valve offers an un-symmetric port timings unlike a piston ported timing.

Further the invention discloses different dual passage gaseous fueled carburetors for independently regulating the air and air-fuel mixture. The secondary throttle body 8902 may be separate from the main throttle body 401, while each of the bodies may have either rotary valve 408 or butter fly valve 994b for regulating the flow. Additionally the invention discloses where an external fuel tube 220c connects the metering chamber in the main body to the fuel orifice 411b through a fuel passage 220b in a secondary throttle body 8902. Alternately the secondary throttle body 8901 may be integral part of the main throttle body 401.

DETAILED DESCRIPTION

Figure 1:
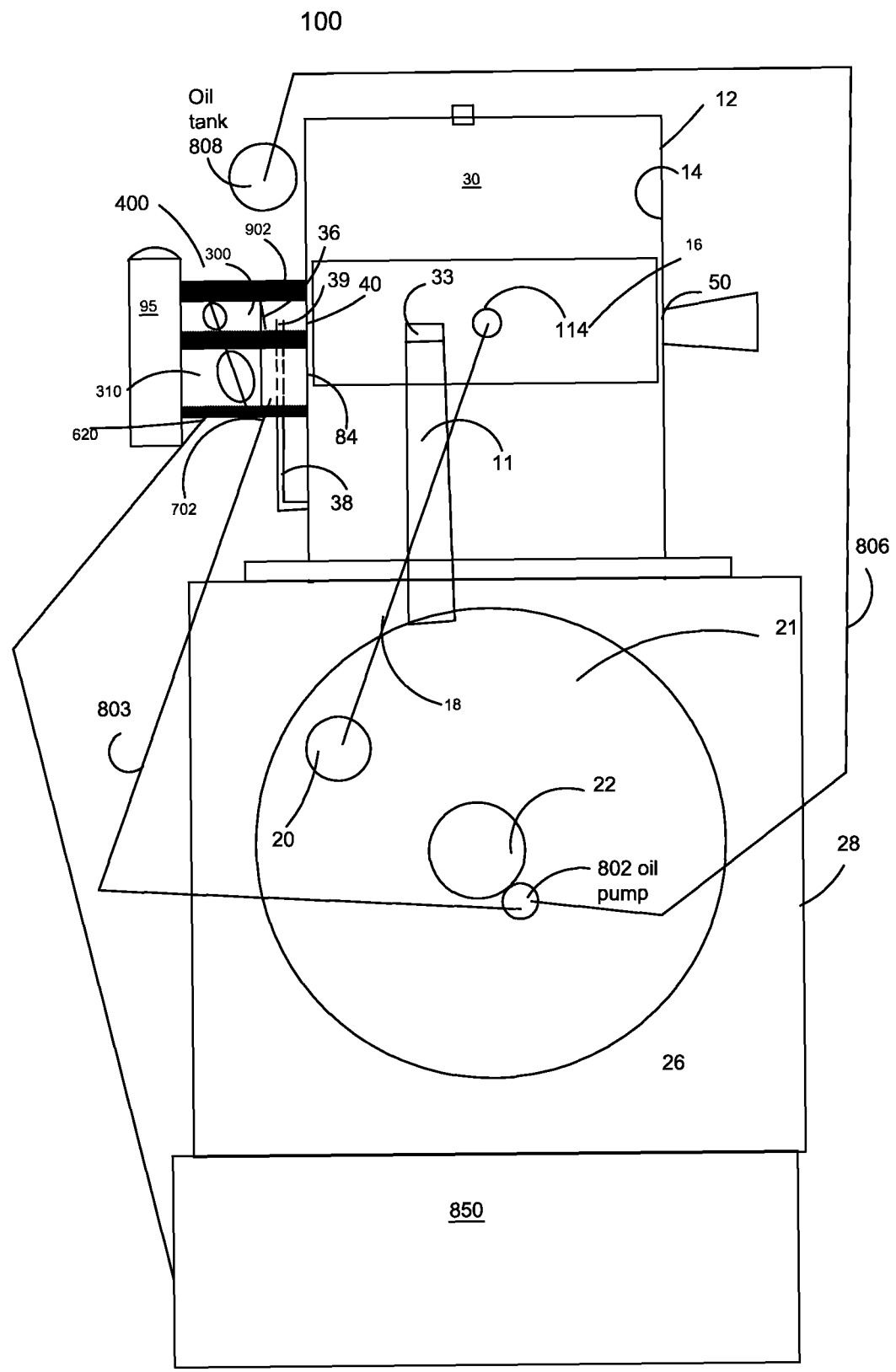
FIG. 1 is a diagram showing the two-stroke engine 100 with charge tube.
Figure 6:
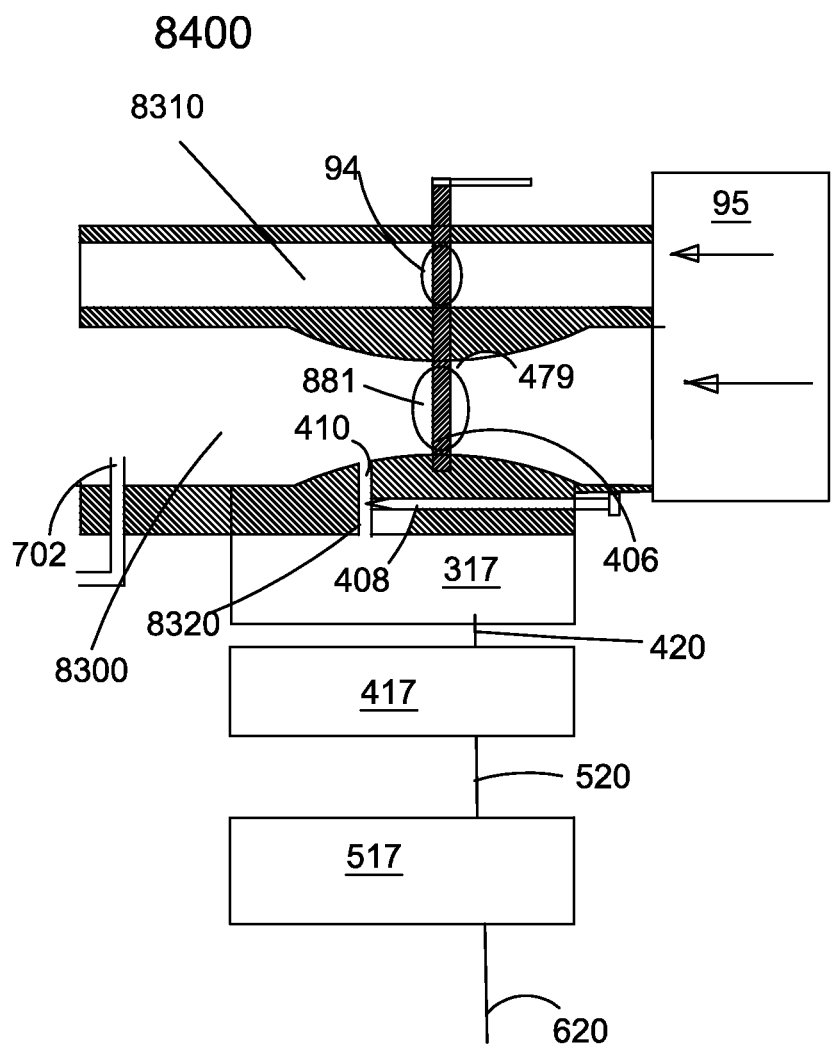
FIG. 6 is a longitudinal sectional diagram of the gaseous fueled carburetor 8400 shown in FIG. 5.

FIGS. 1, through 6 show new two-stroke gaseous fueled oil injected engines with special gaseous fueled carburetors having built in pressure regulator and metering chambers. The two-stroke engine are of stratified type having either a rich charge tube or air-head scavenging as described in U.S. Pat. Nos. 6,901,892, 4,253,433, and 6,273,037. The draw back in the prior arts are that the engines employ gasoline as fuel and oil has to be pre-mixed. The gaseous fuel two-stroke engine made by Mitsubishi as described in U.S. Pat. No. 5,918,574 is not a stratified engine, hence has significantly higher emission levels. The most commonly used gaseous fueled carburetors are not suitable for stratified engines. There are, however, gasoline fueled stratified carburetors, but they are not made to handle gaseous fuels. Therefore it is believed by the inventors that the inventions disclosed here would be beneficial to help the environment and reduce dependence on liquid fuels.

U.S. Pat. No. 6,901,892 for example describes a charge stratified engine in FIG. 1. The operating principle of the innovative engine 100 disclosed in this invention is similar to the engine 10 in the above reference. As such it will be understood by the person who has knowledge of engine will be in a position to execute the disclosed design. Engine 100 in FIG. 1 consists of a cylinder 12 inside which is a reciprocating piston 16 connected to the crankshaft 22 through a connecting rod 18, a crankpin 20 and a piston pin 114. The crankshaft 22 has crank weight 21 and the crankshaft is supported by main bearings either on both ends of a full crank engine or just on one side in a half crank engine. The lower side of the piston has crankcase chamber 26 in the crank case 28. The cylinder 12 has cylinder bore 14 having combustion chamber 30 on the upper side of the piston 16. The crankcase chamber and combustion chamber are interconnected periodically through transfer passage 11. The cylinder has at least one intake port 84, exhaust port 50, at least one transfer port 33 and an injection port 40. The injection port 40 is connected intermittently to the crankcase chamber 26. The lubricating system consists of a oil pump 802 driven by the crankshaft, typically mounted to the side of the crankcase wall. Oil pump 802 has an inlet oil line 806 and receives oil from oil tank 808 and has an outlet pipe 803 injecting oil into the intake passage 310 downstream of the lean valve 80 and possibly into the heat dam 902.

Figure 2:
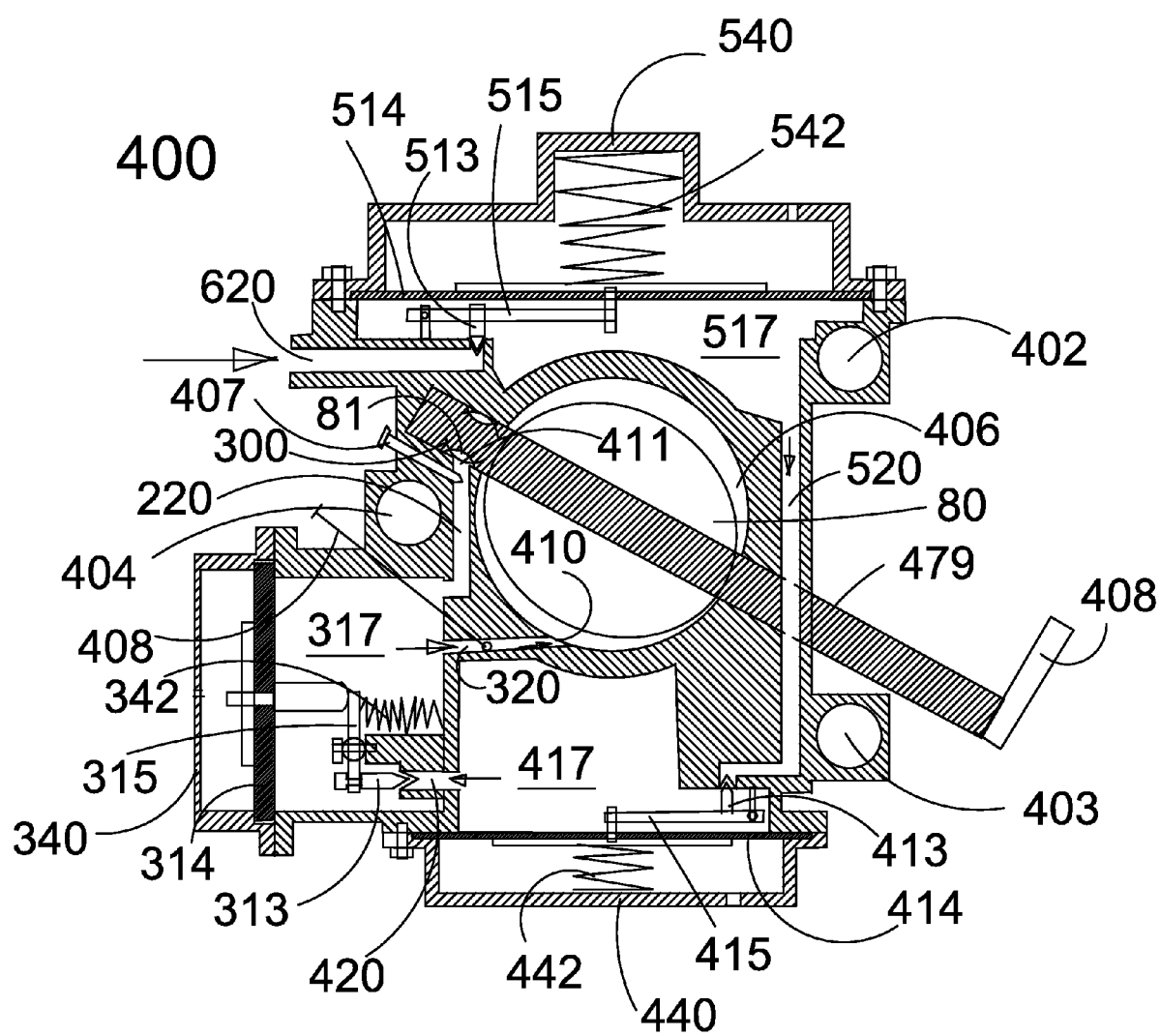
FIG. 2 is a sectional diagram of a special gaseous fuel carburetor 400.
Figure 3:
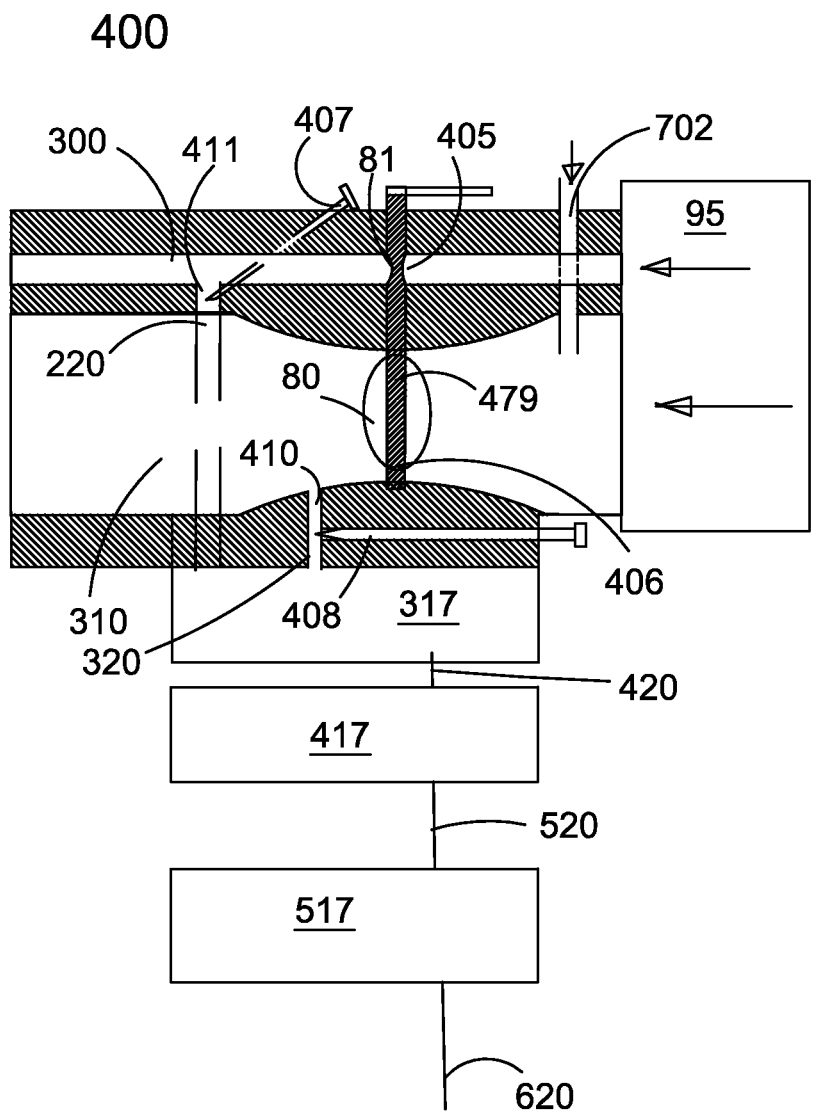
FIG. 3 is a longitudinal sectional diagram of the gaseous fueled carburetor 400 shown in FIG. 2.

The special gaseous carburetor 400 shown in FIGS. 2 and 3 has at least two passages; a rich charge passage 300 and a lean charge passage 310. The gaseous fuel carburetor has at least one pressure regulating chamber and a metering chamber 317. The carburetor disclosed here has a high pressure fuel inlet 620 supplying fuel into a high pressure chamber 517. In some embodiments, the construction of the high pressure chamber 517 receiving high pressure fuel at inlet 620 is to be constructed in accordance with the chamber shown in FIG. 5. High pressure chamber 517 has a diaphragm 514 and a high pressure needle valve 513 activated through a high pressure arm 515. The diaphragm 514 has a spring 542 on the ambient side of the diaphragm and the spring and the diaphragm are held in place by the high pressure chamber cover 540. The ambient side of the diaphragm is at ambient pressure. The high pressure chamber 517 is connected to a low pressure chamber 417 through a high pressure fuel passage 520. Similar to the high pressure chamber 517, the low pressure chamber has a low pressure needle valve 413, diaphragm 414, arm 415, a spring 442 and a cover 440. The low pressure chamber 417 is connected to a metering chamber 317 through a low pressure fuel passage 420. The metering chamber also has a metering chamber needle valve 313 activated by the metering chamber arm 315. The metering chamber diaphragm is pushed outward by a metering chamber spring 342, which also acts against the metering chamber needle valve 313 to keep the fuel flowing from low pressure chamber 417 to the metering chamber 317 when the engine is not running and when the pressure across the metering chamber diaphragm 314 is same is zero, that is; the pressure in the metering chamber 317 is same as ambient. Fuel can flow into the metering chamber 317 only when the pressure in the chamber 317 is sub atmospheric and thus preventing any fuel leak into the intake passage when the engine is dead.

When the engine is running, the sub atmospheric pressure intake passages 406 and 300 is sub-atmospheric, the pressure in the metering chamber 317 also drops to sub atmospheric causing the diaphragm to move inward against the spring 342, thus opening the needle valve 313 to open. The metering chamber has lean fuel passage 320 to the lean passage 310 opening at the fuel orifice 410, preferably at the venture 406 and may have more than one orifice as described in gasoline carburetors in the prior arts. The metering chamber 317 also has a rich fuel passage 220 supplying fuel to the rich passage 300 through the fuel orifice 411. The fuel flow to the fuel passages 320 and 220 are adjustable through the respective screws 408 and 407.

As the pressure in the metering chamber 317 drops, the metering needle valve 313 is lifted off its seat letting the fuel to flow in from the low pressure chamber 417 through the passage 420. In turn, when the pressure in the low pressure chamber 417 drops, the low pressure needle valve 413 is lifted off its seat, because the needle 413 is activated by the low pressure arm 415 attached to the low pressure diaphragm 414, which is pushed downward by the low pressure spring 442. The diaphragm 414 and the low pressure spring is held in place by the low pressure chamber cover 440. When the pressure in the low pressure chamber 417 drops, the low pressure needle valve 413 opens and the fuel flows from the high pressure chamber 517 to the low pressure chamber 417 through the high pressure passage 520. The drop in pressure in the high pressure chamber 517 causes the high pressure diaphragm 514 to move downward thus the high pressure needle valve 513 is lifted off its seat letting the high pressure fuel to flow from the high pressure fuel tank 700 through the fuel inlet 620. As described, the pressure drops in stages from high pressure to the almost atmospheric in the metering chamber 317. The gaseous fuel stored in a propane or butane tank 700, for example in a Coleman's propane fuel tank is at about 100 psi or a Butane fuel tank commonly used by Mitsubishi's trimmer engine is at a lower pressure.

The gaseous carburetor 400 has a rich charge passage 300 supplying rich charge (rich fuel-air mixture) into the injection tube 38, through a one way valve 36 in the intake heat dam 902. As described in prior art, U.S. Pat. Nos. 6,901,892 and 6,293,235. The lean passage 310 supplies lean charge (lean fuel-air mixture) with oil into the crankcase chamber 26. The intake and scavenging process is explained in detail in the prior arts U.S. Pat. No. 6,901,892 and others. It is to be known that person skilled in the art understands the operating principle by reading the prior arts U.S. Pat. Nos. 6,901,892 and 6,293,235 in its entirety. However, in this invention, the oil is injected into lean charge in the lean passage 310, preferably at the intake heat dam 902. The flow of rich and the lean charge into the engine are regulated by the respective control valves 81 and 80. Both the valves 81 and 80 are mounted on to a common throttle shaft 479. However, they may be mounted on separate throttle shafts linked to each other and may be at phase with each other. Also, in the disclosure, the undercut (or a through hole) in the throttle shaft 479 in the rich charge passage may act as a throttle valve 81 and not have a separate valve. It must be understood that the dual valves may be of any type; butterfly valve, rotary valve also known as barrel valves, or slide valve, which are commonly known to the person skilled in the art. The passages of the carburetors 400 and 8400 may be one piece or may be two separate bodies.

Further the invention discloses a dual passage carburetor 8400 for air-head stratified engines. Prior arts U.S. Pat. Nos. 6,901,892 and 6,112,708 describe in detail the operating principle of a air-head stratified engine. Engine 200 in FIG. 4 consists of a cylinder 2012 inside which is a reciprocating piston 2016 connected to the crankshaft 22 through a connecting rod 18, a crankpin 20 and a piston pin 114. The crankshaft 22 has crank weight 21 and the crankshaft is supported by main bearings either on both ends of a full crank engine or just on one side in a half crank engine. The lower side of the piston has crankcase chamber 26 in the crank case 28. The cylinder 2012 has cylinder bore 14 having combustion chamber 30 on the upper side of the piston 2016. The crankcase chamber 26 and combustion chamber 30 are interconnected periodically through transfer passage 11 and transfer port 33. The cylinder 2012 has at least one intake port 84 for air-fuel mixture, at least one air inlet port, exhaust port 50, and at least one transfer port 33. The engine operates like a conventional two-stroke engine. First and second piston ports 99 and 101 are disposed on the skirt 2113 of the piston 2016 and are connected to each other in gaseous communication by air channel 96. The complete description of the air-head engine is described in entirety in the U.S. Pat. No. 6,901,892. The lubricating system consists of a oil pump 802 driven by the crankshaft, typically mounted to the side of the crankcase wall. Oil pump 802 has an inlet oil line 806 and receives oil from oil tank 808 and has outlet pipe 803 injecting oil into the intake passage 310 downstream of the lean valve 80 and possibly into the heat dam 904. The engine 200 described is referred to as a piston ported air-head engine. It must be understood that the air-head stratified engine may also be a reed valve air-head stratified engine, where in the air is inducted into the transfer passage 11 through a reed valve (also known as one-way valve) as described in U.S. Pat. No. 6,901,892 in FIG. 31. However, it is optional to have rotary valve open and close the opening of the transfer passage in the crankcase chamber.

Figure 5:
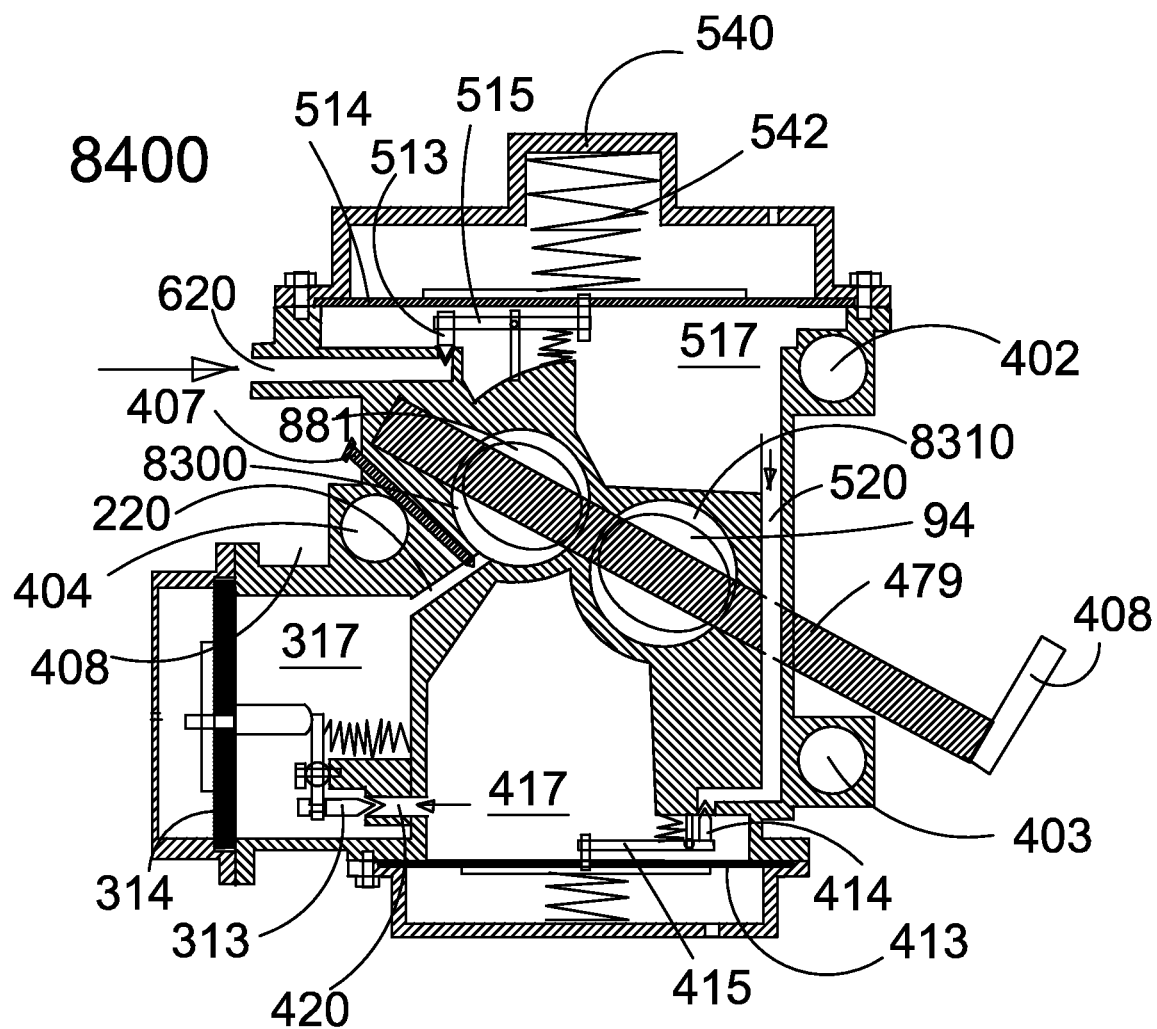
FIG. 5 is a sectional diagram of a dual passage gaseous fuel carburetor 8400.

Further, the dual passage gaseous carburetor 8400 shown in FIGS. 5 and 6 have common pressure regulating and metering parts as described with respect to carburetor 400. As such description and operating principle will not be repeated. However, the main difference between the carburetor 400 and 8400 is that in carburetor 8400, only the air-fuel passage 8300 is supplied with the gaseous fuel through a fuel passage 8320 from the fuel metering passage 317, whereas, the air passage 8310 supplies only air into the transfer passages. Air-fuel mixture and air are regulated by the respective air-fuel valve 881 and air valve 94 respectively. Fuel is adjusted with the fuel adjusting screw 408. The oil is injected into the air-fuel passage 8300 at downstream of the air-fuel valve 881 through an oil injector. The oil may also be injected directly into the crankcase chamber 26 through the side wall of the crankcase 28 or may also be injected through a central hole in the crankshaft 22 and through a cross drilled hole in the counter weight (not shown). When injected directly into crankcase chamber or through crankshaft, it eliminates the need for oil feed line 803. Also, the oil tank may be attached to the side of the crankcase on the outside between the starter housing and the crankcase outer wall. It must be understood that the carburetors 400 and 8400 may be combined to form a three-way carburetor as described in U.S. Pat. No. 6,901,892 and shown in FIG. 7, however, it will be a gaseous fuel with oil injection into lean charge passage. Also, the control valves may be of any type; butterfly valve, barrel or rotary valve, or slide valve.

It is also possible for rich fuel to be inducted into the injection tube 38 and the opening into the crankcase chamber 26 be periodically opened and closed by the cut out on the counter weight 21, as described in the prior art U.S. Pat. No. 6,901,892. Also, it is possible that the pure air with or without oil injected into the air be inducted into the crankcase chamber 26 through transfer ports 33 as in the air-head engine described in U.S. Pat. No. 6,901,892, where as the air inlet is through a one way valve or through the air channel in the piston as described in U.S. Pat. No. 6,901,892.

Figures 7, 8:
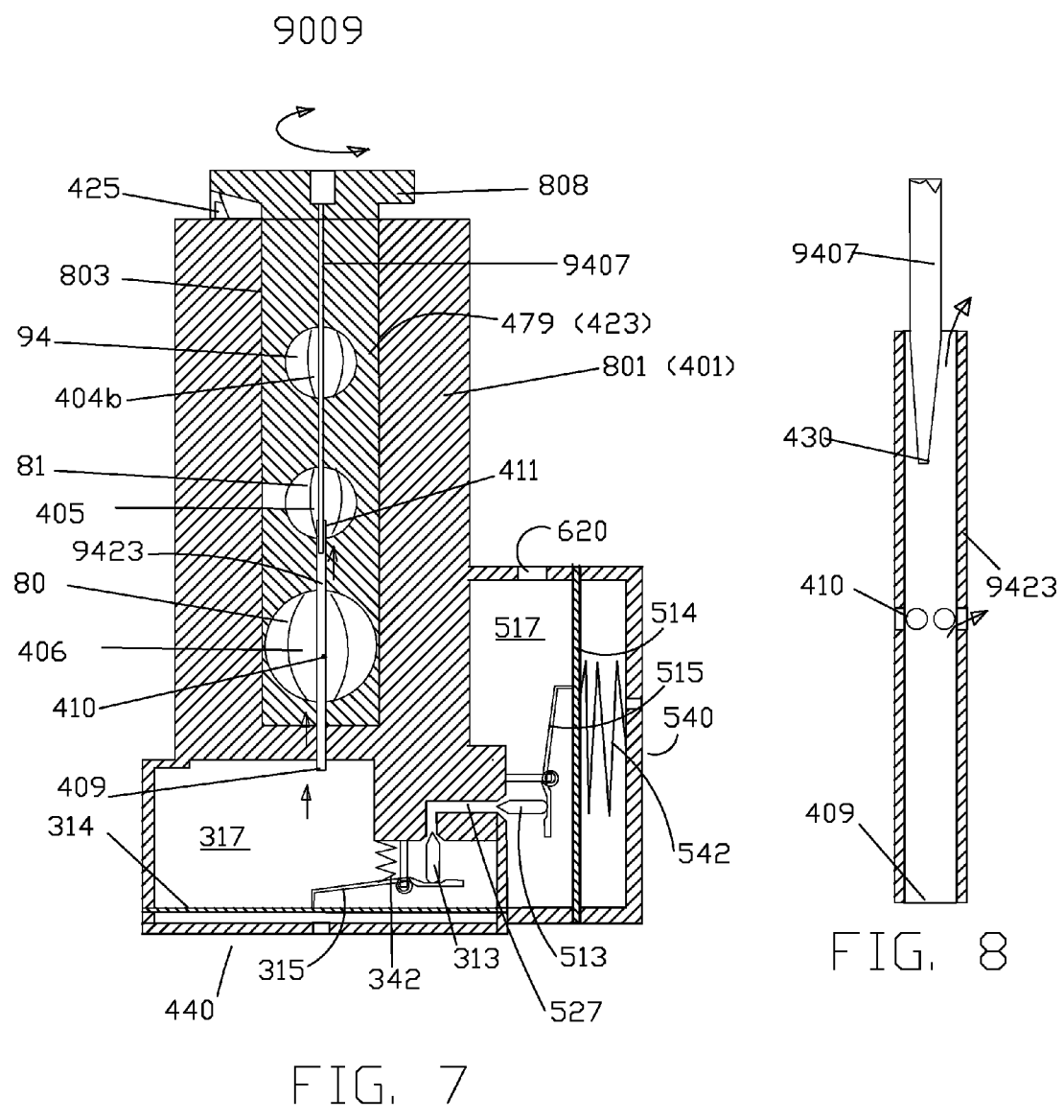
FIG. 7 shows a three way carburetor 9009, according to some embodiments.
FIG. 8 shows details of the fuel jet 9423 and the regulating fuel needle 9407, according to some embodiments.

Further FIG. 7 shows a three way carburetor 9009, in which there are three barrel valves 94, 81, and 80 are respectively control only air, rich charge, and lean charge. The three valves are mounted on a rotatable barrel valve body 803 in a gaseous fuel carburetor body 801. The operating principle of the gaseous carburetor 8900 is similar to the carburetor 8800. The valve 94 regulates only the air, valve 81 regulates a rich air-fuel mixtures, and the valve 80 regulates lean air-fuel mixtures to the engine.

FIG. 8 shows details of the fuel jet 9423 and the regulating fuel needle 9407. It shows that the fuel needle 9407 having a tapered tip 430. As the fuel needle 9407 slides upward the effective flow area for the fuel increases. The fuel jet 9423 also has lateral holes that supply fuel to the lean air-fuel mixture in passage 406. U.S. Pat. No. 6,901,892 describes in details a three way liquid fuel carburetor which does not have pressure regulator as described in this embodiment.

The air fuel mixture (or air) could be regulated by a rotary valve. Alternatively, the air passage 8310b could be regulated by a butterfly valve, where the two valves are connected by some kind of linkage. Similarly, the air fuel mixture passage could be regulated by a butterfly valve, with the air passage regulated by a rotary valve. In this case too, the valves could be connected by a linkage.

Figure 4:
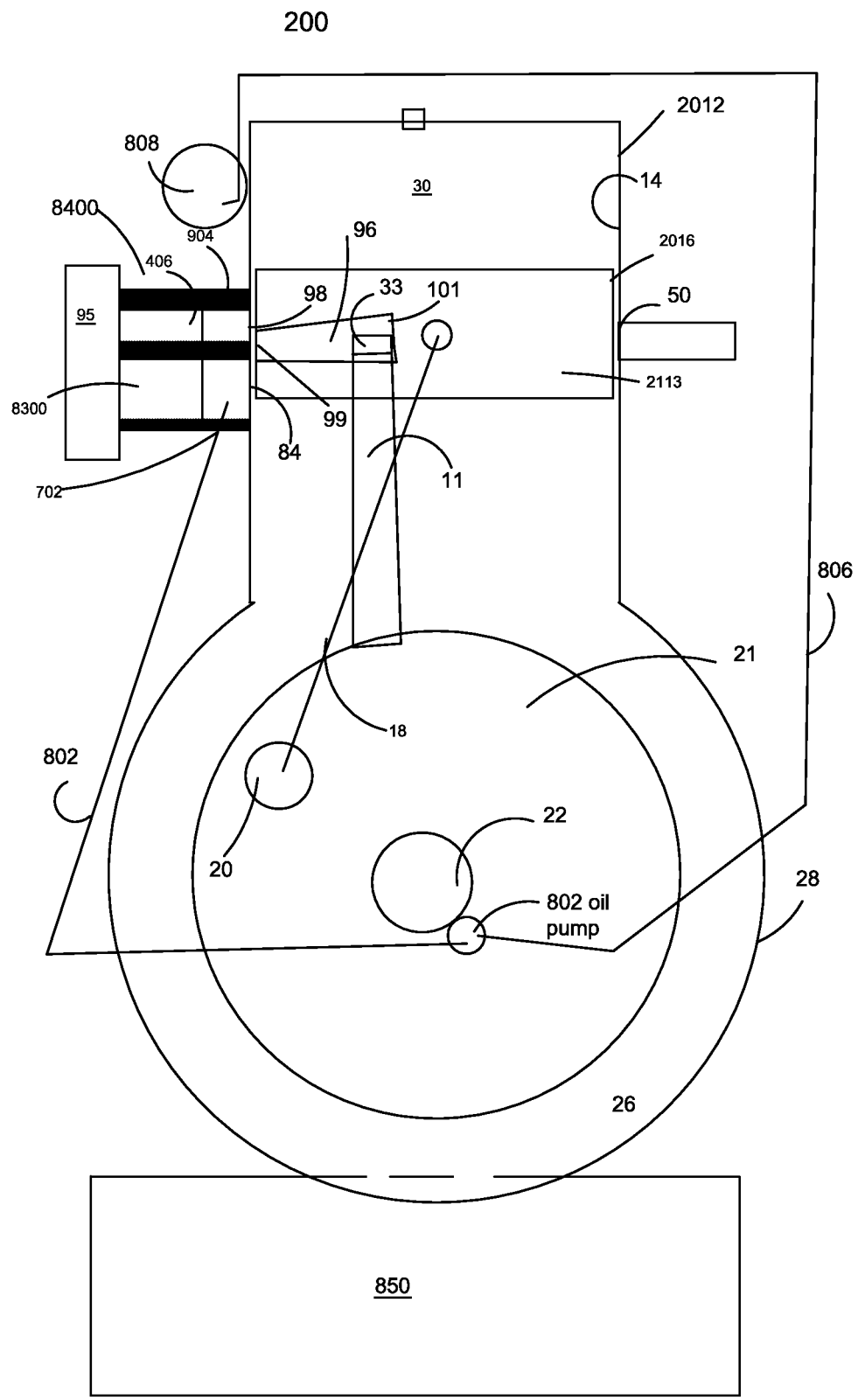
FIG. 4 is a diagram showing the two-stroke engine 200 with air-head stratification.
Figure 9:
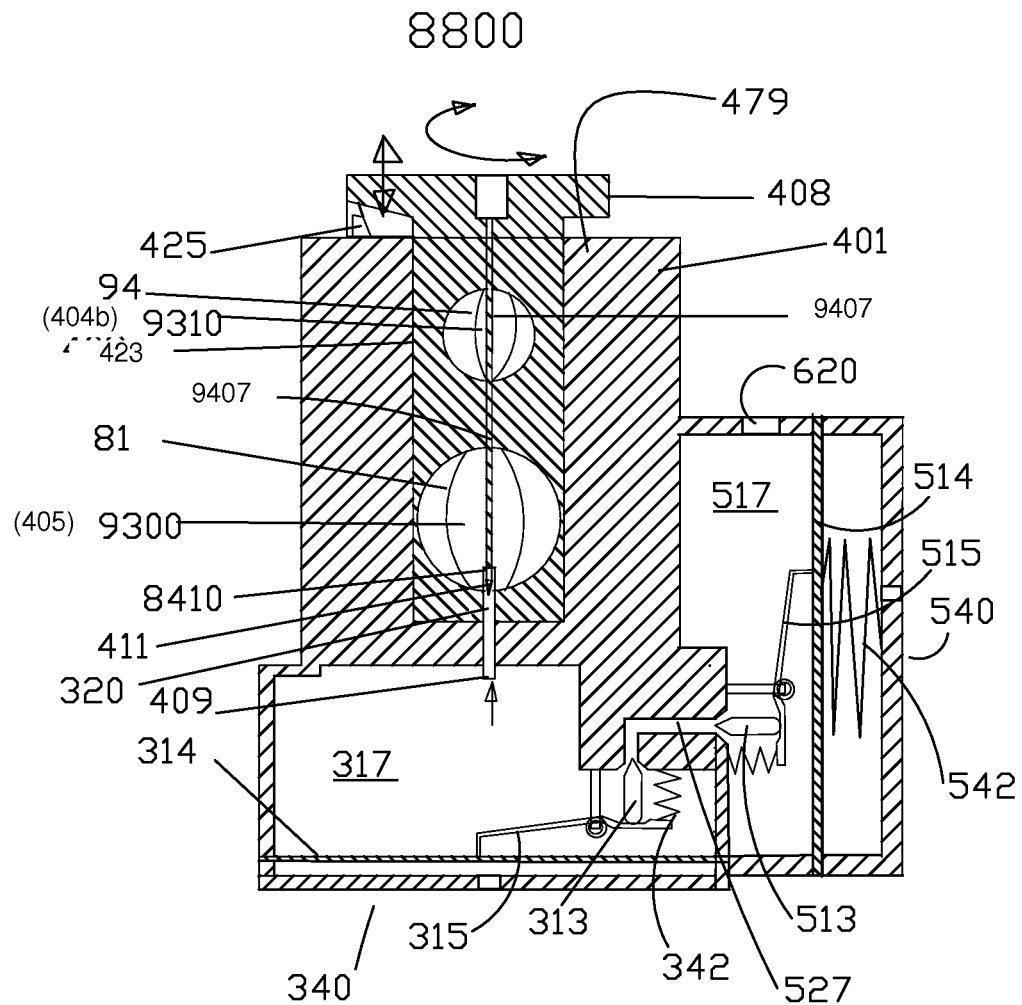
FIG. 9 shows dual passage carburetor 8800, according to some embodiments.

The two-way carburetor 8800 is illustrated in more detail in FIG. 9 and the engine is illustrated in detail in FIG. 4. As the piston 2113 ascends in the cylinder bore 14 of the engine, the pressure in the crankcase chamber 26 drops below ambient. The differential pressure between the crankcase chamber 26 and the ambient (outside of the carburetor) causes air to flow into the crankcase chamber 26 through the appropriate passages (transfer passages or charge passages). There are two flow transversely extending venturi passages in a longitudinally extending barrel 423 of a two-way carburetor. An air venturi passage 404*b* allows only air, which is regulated by the air control barrel (rotary) valve 94, to flow into the transfer passage 11. A charge venturi passage 405 flows air-fuel mixture regulated by a charge barrel (rotary) valve 81 into the charge passage 406 directly into the crankcase chamber 26. The air control and charge barrel valves are mounted on a rotatable barrel (rotary) valve body 403 in a gaseous carburetor body 401 having at least one pressure regulating chamber 517 and a metering chamber 317, having a fuel passage 320 feeding fuel from metering chamber 317 into the passage 9300 (405).

Further, the dual passage gaseous carburetor 8800 shown in FIG. 9 has a pressure regulating and metering parts as described with respect to carburetor 8400, shown in FIG. 6. As such description and operating principle will not be repeated. However, the main difference between the carburetor 8800 and 8400 is that in carburetor 8800, the regulating valves for only air and for air-fuel mixtures are the rotary barrel valves 94 and 81 respectively are on a single barrel valve body 423. Also, it should further be noted that there is at least one pressure regulating chamber 517 connected to the metering chamber 417 through a passage 527. The passage 320 is in the form of a tube extending through the barrel valve body (423) and opening into the air-fuel charge venture passage 405 (9300). The fuel tube 320 in this carburetor 8800 extends slightly into the metering chamber 417. The amount of fuel is regulated by a needle valve 9407 having a tapered end 430 at the lower tip of the needle 9407. Alternately, the fuel tube 320 may have a slot or opening at the upper tip in triangular shape, while the regulating needle is cylindrical in shape. As the needle 9407 is sliding up and down as the barrel valve body 403 is rotated, the amount of fuel is also varied. The barrel valve body 403 is resting on a wedge (ramp) 425 and the top of the barrel valve body 403 has a flat disc 408 having a ramp on the lower surface. Thus as the valve body 403 is rotated, the ramp on the wedge forces the valve body 403 to rise as well, which in turn rises the fuel control needle 9407. The tapered shape of the needle in the fuel tube 320 varies the flow area for the fuel. Thus the fuel and air are concurrently varied.

The pressure regulating chamber 517 and metering chamber 417 are integral to the barrel valve carburetor body 401.

Figure 9B:
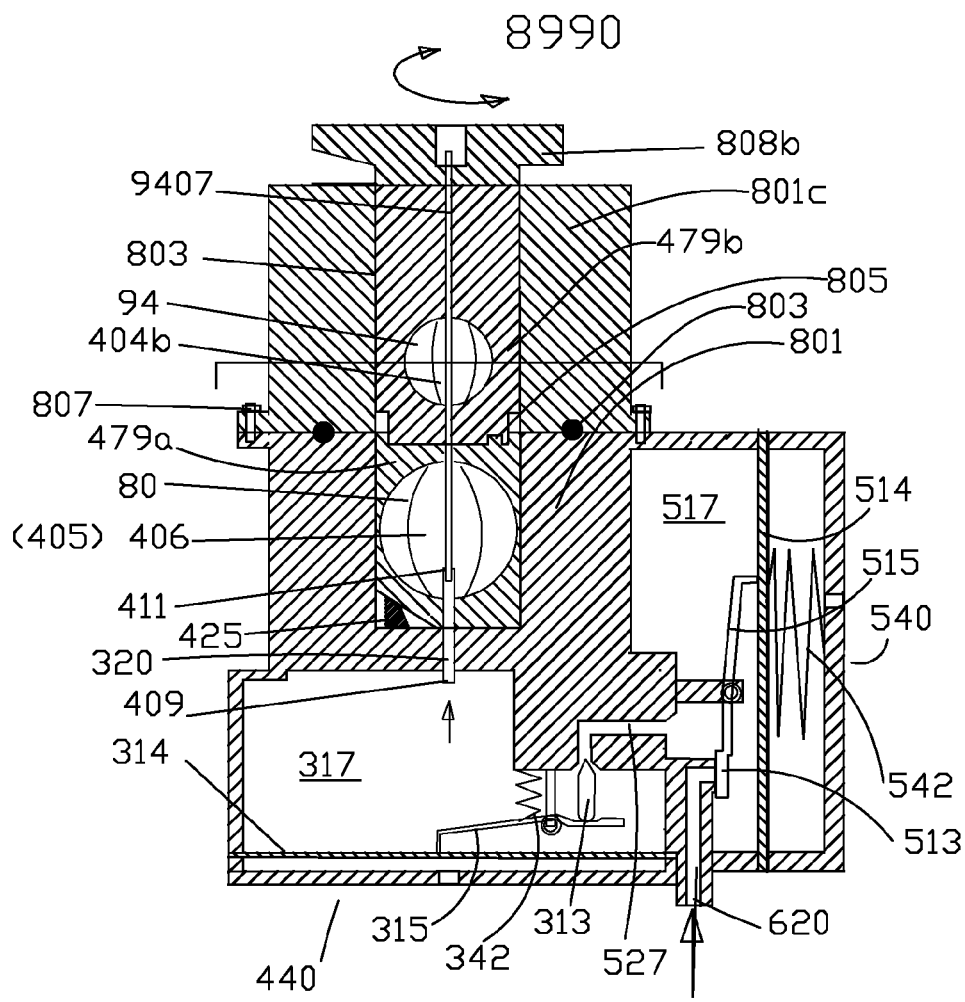
FIG. 9b shows dual passage carburetor 8990 having stackable throttle bodies.
Figure 9C:
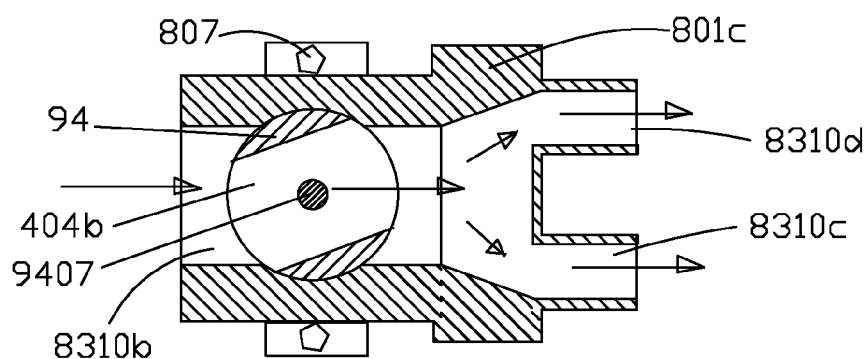
FIG. 9c shows cross sectional view of air throttle body 801c having dual outlets for air.

FIG. 9*b* shows where the air throttle body 801*c* and the air-fuel throttle body 801 (401) are two separate bodies stacked up such that the rotary barrel valves 479*a* and barrel valve 479*b* are concentric and one is on top of the other and the bodies 801 and 801*c* are fastened together with a gasket 803 sandwiched between the two bodies. The rotary valves for air 479*b* and 479*a* are two separate pieces, but acting as a single piece because of the coupling 805. However, the rotary valve can be a single piece as shown in FIG. 9. The advantage is that the air-fuel throttle body can be common to dual passage carburetor and also a single passage carburetor. As such no separate tooling is necessary to make two separate throttle bodies for the use of carburetors on conventional and stratified two-stroke engines. FIG. 9*c* show cross sectional view of the air throttle body having a single inlet passage 8310*b* for air, but having dual outlets 8310*c* and 8310*d*. The advantage with dual outlet passage system is that the manifold 904*c* used in stratified engine 360 can be exactly similar to the manifold of a conventional non-stratified two-stroke engine and does not have to be a complex type manifold as disclosed in a prior art, U.S. Pat. No. 6,112,708. The advantage of stacked up dual passage throttle bodies is that the air-fuel throttle body 801 may be used for both conventional and stratified two-stroke engines. With the dual outlet air throttle body, conventional manifold as used with a single passage carburetor may be used without having to retool for a new manifold.

Figure 10:
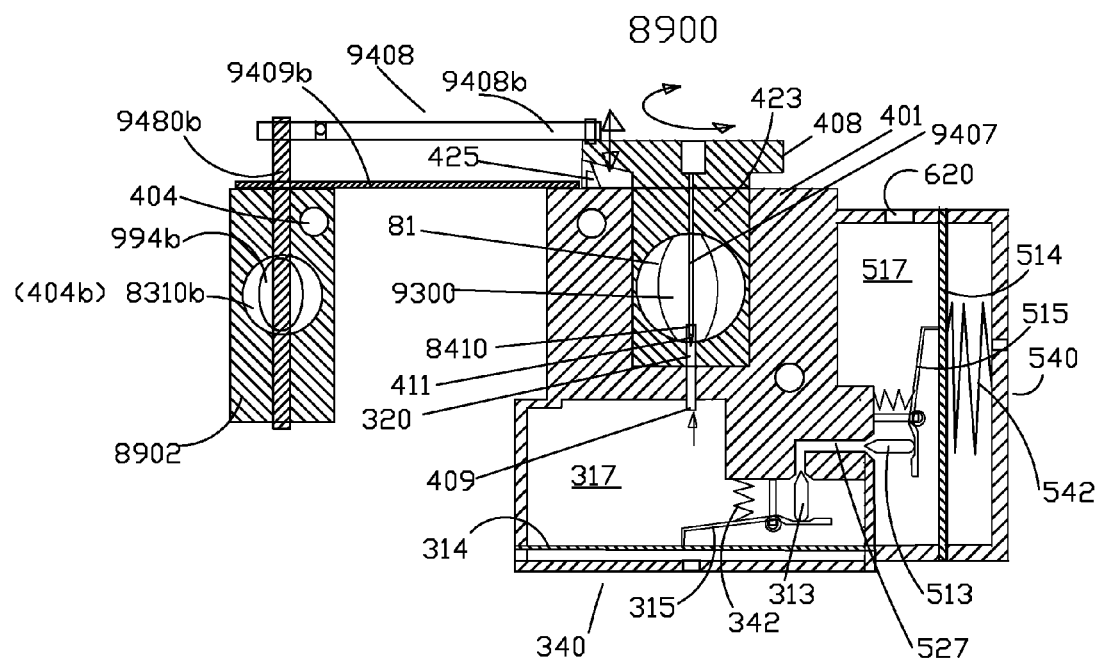
FIG. 10 shows a dual passage gaseous fueled carburetor 8900, according to some embodiments.
Figure 10B:
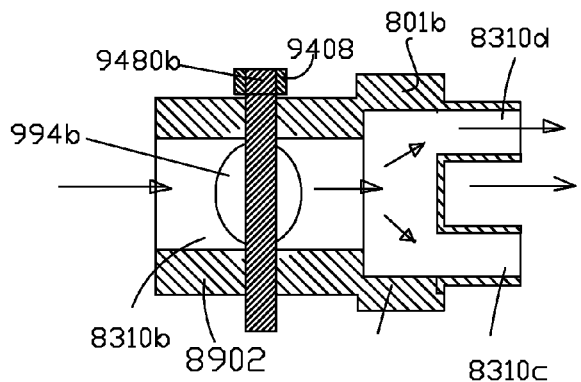
FIG. 10b shows cross sectional view of the throttle body 8902 with dual outlets for air.
Figure 10C:
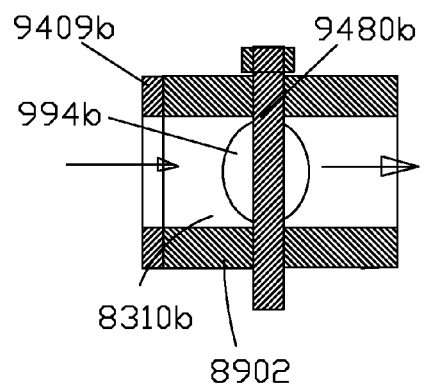
FIG. 10c shows cross sectional view of the throttle body 8902 with single outlet for air.
Figure 11:
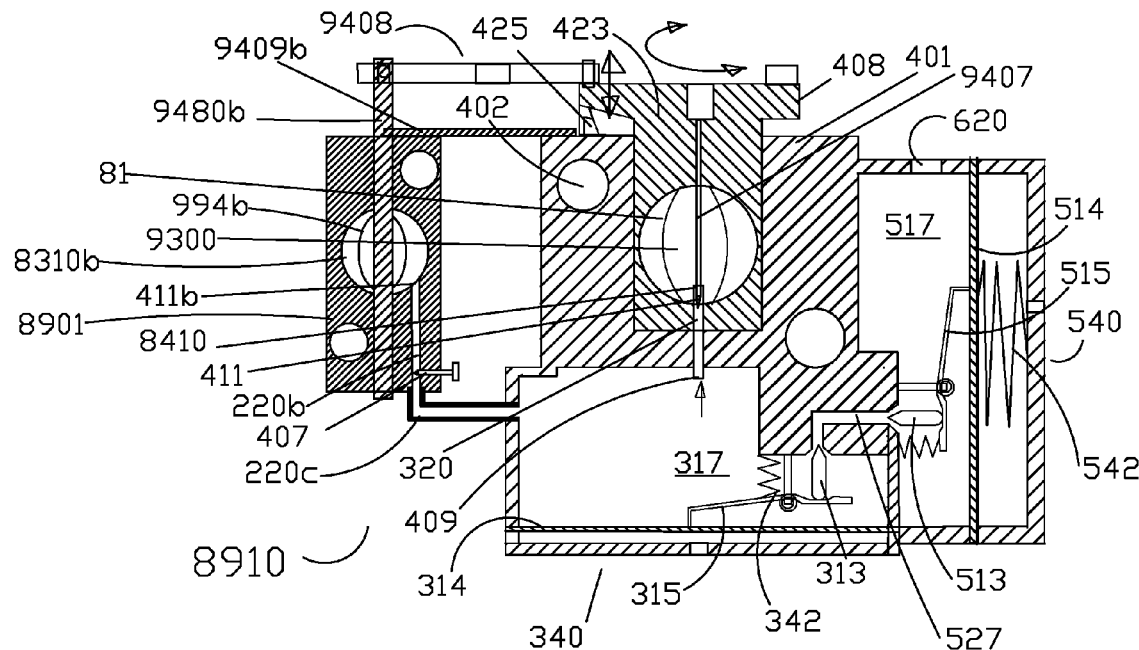
FIG. 11 shows dual passage gaseous fueled carburetor 8910 having a separate secondary throttle body 8901.
Figure 12:
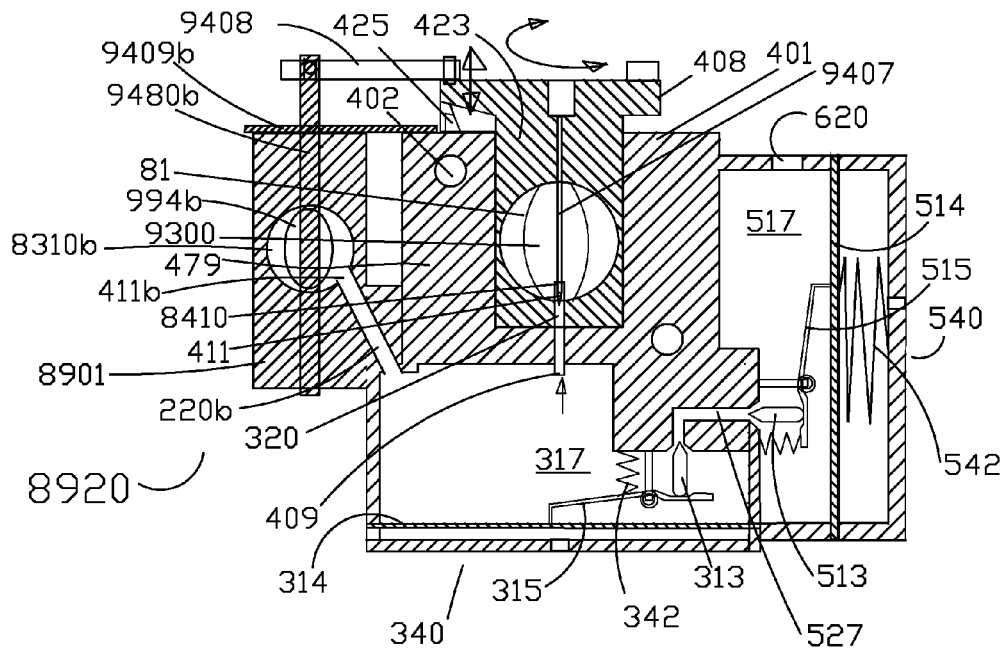
FIG. 12 shows dual passage gaseous fuel carburetor 8920 having secondary throttle body 8901 having butter fly valve and main throttle body 401 having rotary valve.
Figure 13:
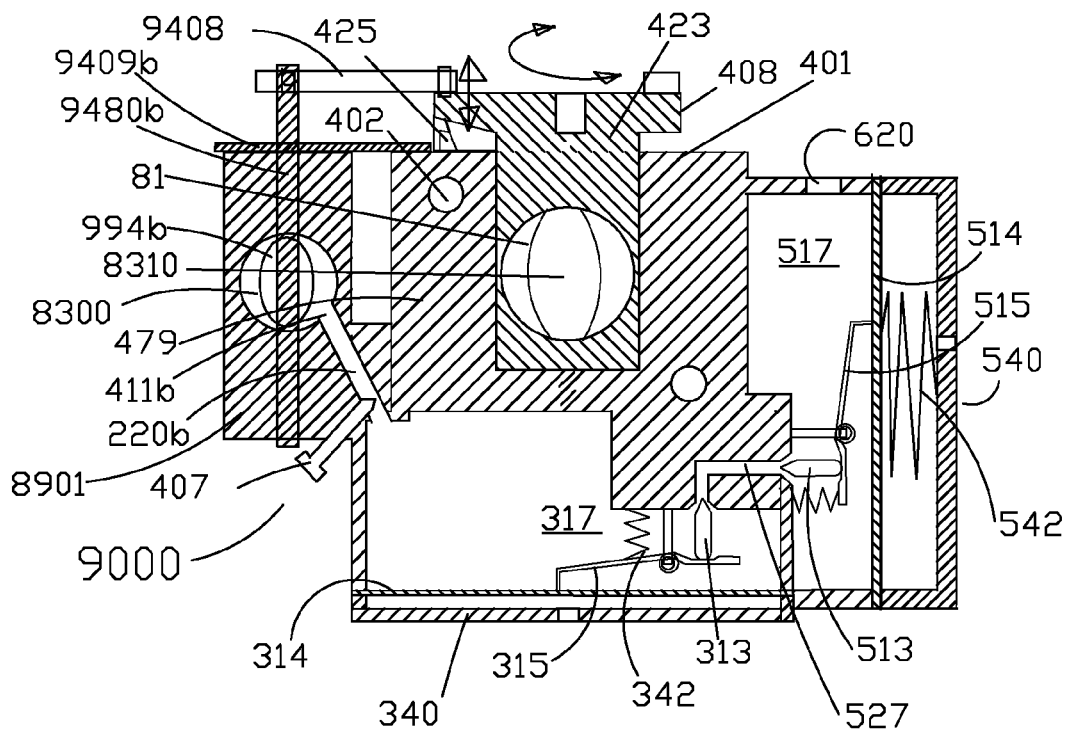
FIG. 13 shows dual passage gaseous fuel carburetor 9000 having rotary throttle valve for air only in the main throttle body 401 and a secondary throttle body 8901 for air-fuel mixture.
Figure 20:
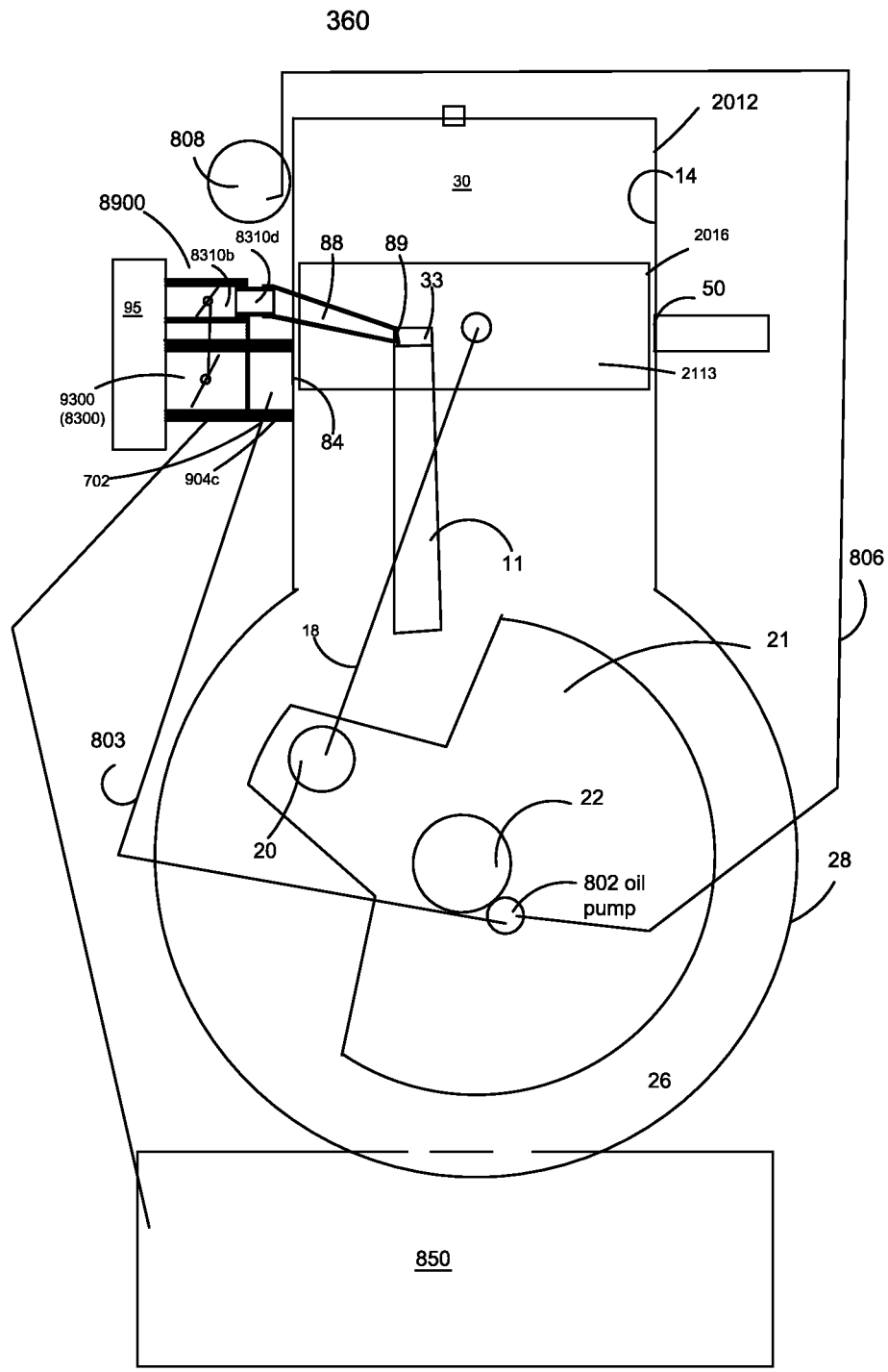
FIG. 20 shows an air-head stratified two-stroke engine 360 with simple manifold having a reed valve (one-way valve) at the top of the transfer passage.

FIG. 10 shows the a dual passage gaseous fueled carburetor 8900 having a rotary barrel valve 81 for the regulation air-fuel mixture in a similar way explained for the dual passage gaseous carburetor 8800 shown in FIG. 9. However, valve for regulating the air only passage is now a butterfly valve 994*b*, in a separate body 8902, interconnected by a linkage 9408*b* to the flat disc 408 on the barrel valve body 403. The body 8901 of the butter fly valve 994*b* could be rigidly mounted to the gaseous fuel barrel valve carburetor body 401 through a rigid body 9409*b*. FIGS. 10*b* and 10*c* show two types of throttle bodies for the air control. In FIG. 10*b*, the air passage 8310*b* in the body 8902 is divided into two separate passages 8310*c* and 8310*d*, each connected to the air pipe 88 to supply air into the transfer passages 11 on either side of the exhaust port 50. Whereas, in FIG. 10*c*, the single air passage 8310*b* is exiting the throttle body 8902. Advantage with single exit air passage is that an integral air pipe 87 (shown in FIG. 21) can be used to supply air to the left and right transfer passages. Whereas with dual exits air throttle body, two separate air pipes (left and right) are used. Secondly a simple manifold 904 may is used in both the types of air throttle bodies disclosed in FIGS. 20 and 21. The manifold 904 shown in FIG. 20 is similar to the type used in a conventional two-stroke engine, where the intake system does not have additional air supply system (commonly used in stratified engine). The manifold (suction fitting 4) disclosed in the prior art U.S. Pat. No. 6,112,708, is a complex and larger in size. However, the functionality of the manifold (suction fitting) described in the prior art can easily be integral with the throttle body (8902) itself as disclosed in this new embodiment. The advantage is that the manifold need not be retooled nor be as complex, while the throttle body 8902 can be cast either as a single exit and dual exits for easy manufacturing and assembly. FIG. 11 shows a dual passage carburetor 8910 having a separate secondary throttle body 8902 attached to the main throttle body by means of a member 9409*b*. The secondary throttle body 8902 has a valve 994*b*, which can be a butter fly valve, rotary valve, slide valve or a simple shaft (or tubular) valve having a slot as shown in FIG. 2. The secondary throttle body regulates either just the fuel only or air-fuel mixture into the injection tube 38 in a stratified charged engine. The secondary throttle body 8902 has a fuel passage 220*b* receiving fuel from the metering chamber 317 in the main throttle body 401 through an external fuel tube 220*c*. The main throttle body 401 (479) has a rotary valve 81 to regulate air-fuel mixture as shown in FIGS. 11 and FIG. 12. Where as in a FIG. 13, the main throttle body has valve 423 to regulate only air and the main venture (passage) 8310 is not does not receive fuel. The regulating valve 423 may be of sliding valve as used in conventional gaseous fueled carburetors, or rotary barrel valve as shown in FIG. 13, or a butter fly valve as shown in FIG. 3.

Figure 14:
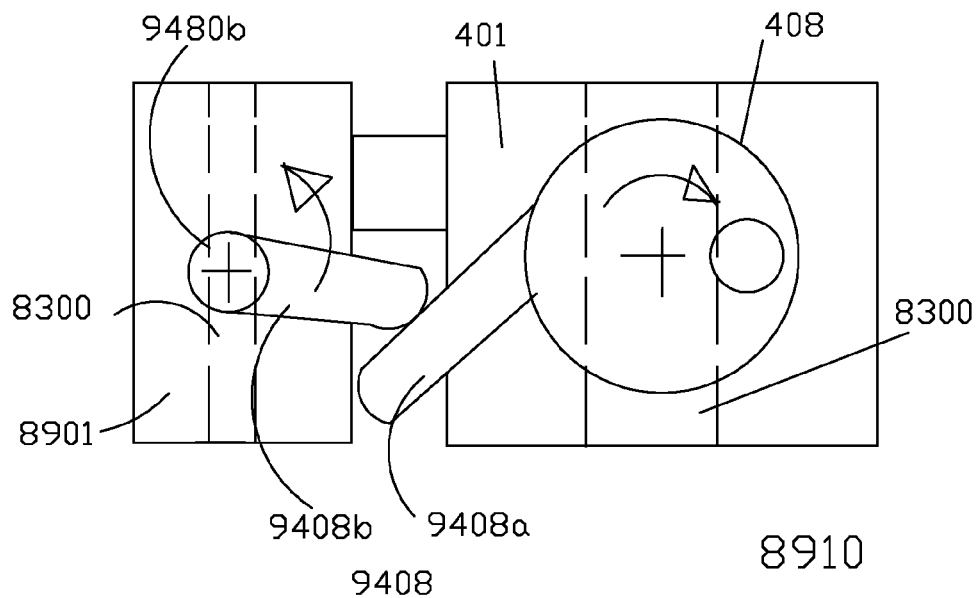
FIG. 14 shows top view of dual passage carburetor having throttle valve actuator assembly 9408.

FIG. 14 shows top view of the dual passage carburetor, where the throttle actuating assembly 9408 consists of lever 9408*b* attached to the secondary valve 994*b* and a lever 9408*a* attached to the throttle valve disk 408 in the main throttle body 401. The throttle actuating levers 9408*b* and 9408*a* are in contact with each other and have spring load on each to bring to the normally closed position. The two valves operate in conjunction with each other. A delay in actuating one or the other may be achieved by providing a gap between the two in valve closed position. That is; air control valve 81 may be opened later after the air-fuel valve 994b is open from idle to say about 25% of throttle opening. The delay may be desirable for smoother starting and stable idle speed as well as acceleration.

Figure 15:
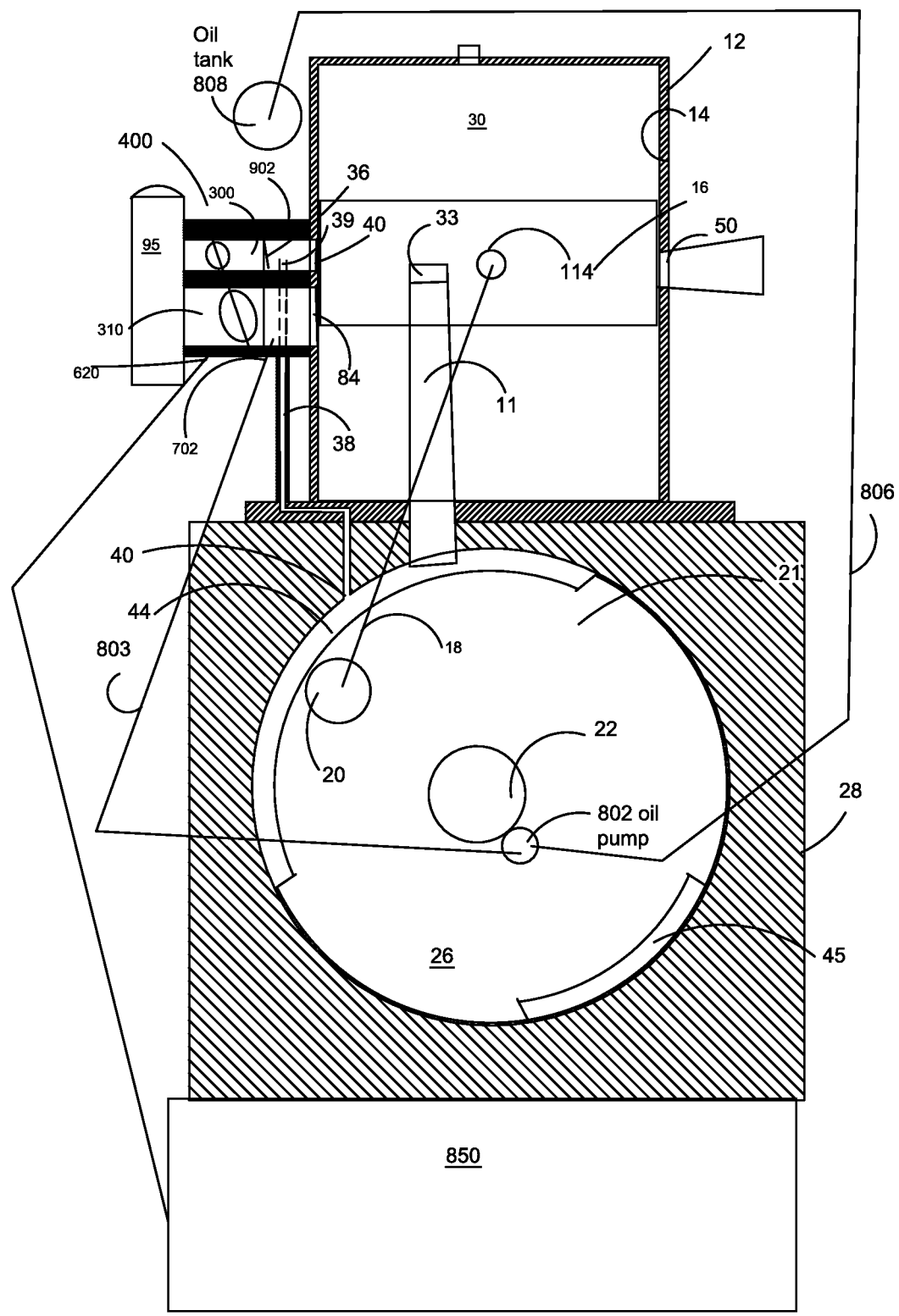
FIG. 15 shows a diagram showing a stratified two-stroke engine 150 having a rotary valve for timing the crankcase port.
Figure 16:
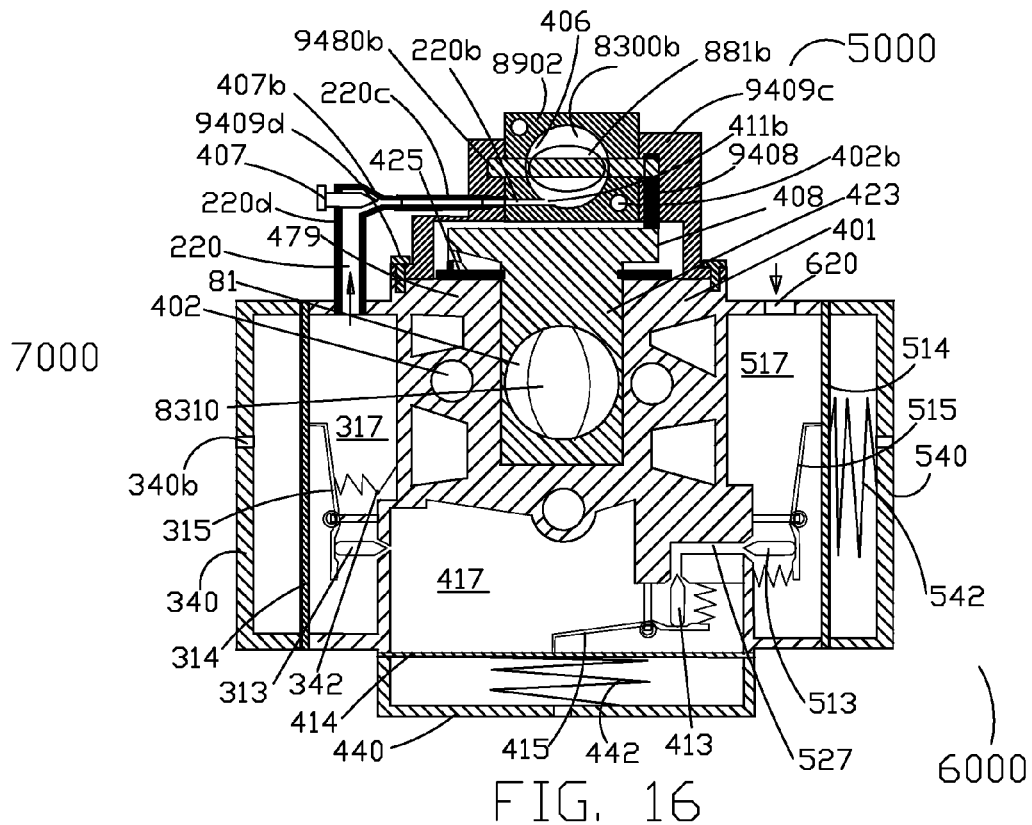
FIG. 16 shows an air regulating valve having multi-stage pressure regulator and a secondary throttle body 8902.

FIG. 15 shows a stratified engine 150 similar to the stratified engine 100 shown in FIG. 1. However, in FIG. 15, the lower end of the injection tube 38 is open directly into the crankcase chamber 26 through a crankcase port 41, which is opened and closed by a cut on the crank web, which is a rotary valve, opening and closing the crankcase port 41 per predetermined timing in respect to upward and downward stroke of the piston. The detailed description of the operation of the rotary shut off valve is explained in the prior art U.S. Pat. No. 6,901,892. The engine FIG. 16 shows a fuel system 7000 having a pressure regulating system 6000 consisting of multiple stage pressure regulating chambers, as shown in FIG. 2, but having an air only regulating valve 81. The fuel system 7000 also has a separate fuel regulating system 5000 having air-fuel (or fuel only) regulating valve 881b. The operating principle of the multiple stage pressure regulating body is similar to the carburetor shown in FIG. 2 and explained earlier. However, it must be noted that the pressure regulating system 6000 does not supply fuel to the air passage 8310 in the pressure regulating body 401, unlike the carburetor shown in FIG. 2. The embodiment clearly shows a separate fuel regulating system 5000, detached from the pressure regulating system 7000 for regulating the fuel. However, the two systems may be attached to one another through a mounting bracket 9409c and fasteners 9409b. The fuel regulating system has a body 8902 having a regulating valve 881b, which can be one of many types, such as rotary, butterfly or sliding valve. The body 8902 has fuel passage 200b having at least one fuel orifice 411b opening into the venture 406. The air-fuel (or fuel only) is regulated by the regulating valve 881b depending on the operating condition of the engine. The pressure regulating 6000 system has a body 401 having a rotary valve 423 as shown in FIG. 16 for regulating only the air, required for an air-head (stratified) engine. In the FIG. 16, the air regulating valve 423 is of a rotary valve type (it can be a butterfly or sliding valve type), having a ramp or a cam 425 to operate the valve 881b through linkage 9408. As such the rotary valve rotates to regulate the flow of air through the passage 8310, the valve 881b is also rotated appropriately. The fuel regulating system 5000 has a venturi 406 having at least one fuel orifice 411b. The fuel regulating body 8902 receives fuel from the pressure regulating body 6000 through at least one fuel passage 220 having a fuel adjusting valve 407 having a tapered end and the fuel tube 220d having a tapered seat 407b. The fuel tube 220d is connected to the fuel regulating system 5000 through a flexible hose 220c connecting the internal fuel passage 220b in the fuel regulating body 8902. The air only regulating valve 423 in the pressure regulating body 401 has a ramp (cam) 425 which activates the valve 881b as the regulating valve 423 is operated. Thus the air only valve 423 and air-fuel (or fuel only) valve 881b are actuated simultaneously as the operator actuates the throttle to change engine speed.

The advantages of the separate systems 6000 and 5000 are that the two systems may be mounted part from each other that consistent with the engine architecture. Some two-stroke engines may have reed valved or rotary valved main intake port (not shown) for air-fuel charge located on the crankcase 28, while the air only intake port may be on the cylinder block supplying air into the transfer passage, as shown in FIGS. 4 and 4b. Another advantage is that the air-fuel (or fuel only) regulating body 8902 may be completely isolated from a heavier pressure regulating body 403, from the heat and vibration point of view, because the fuel supply line 220c is a flexible pipe, when the system 5000 is not attached to the system 6000.

Figure 17:
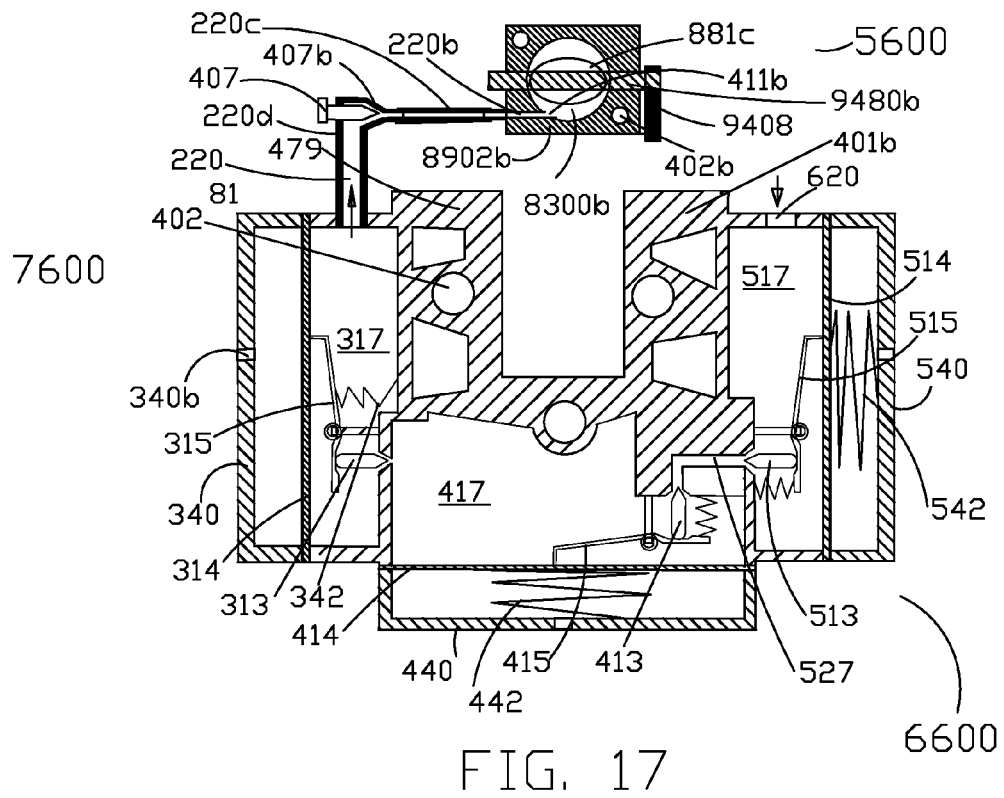
FIG. 17 shows a multi-stage pressure regulator body 401b with a metering chamber 317 integral with the pressure regulating body 401b and a secondary throttle body 8902b.

FIG. 17 shows a fuel regulating system 7600 without any flow controlling valve. As such the system 6600 which is identical to system 6000 and system shown in FIG. 2 from the pressure regulating point of view is simply a body 401b having multiple pressure regulating chambers, which can be mounted remotely away from the intake port of an engine. The air-fuel controlling system 5600, however, has a flow controlling valve 881c to meter the air and fuel mixture into the intake port of an engine. The air-fuel metering system 5600 has a body 8902b with the passage 8300b, at least one fuel orifice 411b. The fuel is supplied from the pressure regulating system 6600 to the system 5600 through a flexible fuel supply line 220c, which again isolates the air-fuel regulating system 5600 from the pressure regulating body 401b. Therefore, the pressure regulating system 7600 can be mounted remotely and separately from the system 5600.

Figure 18:
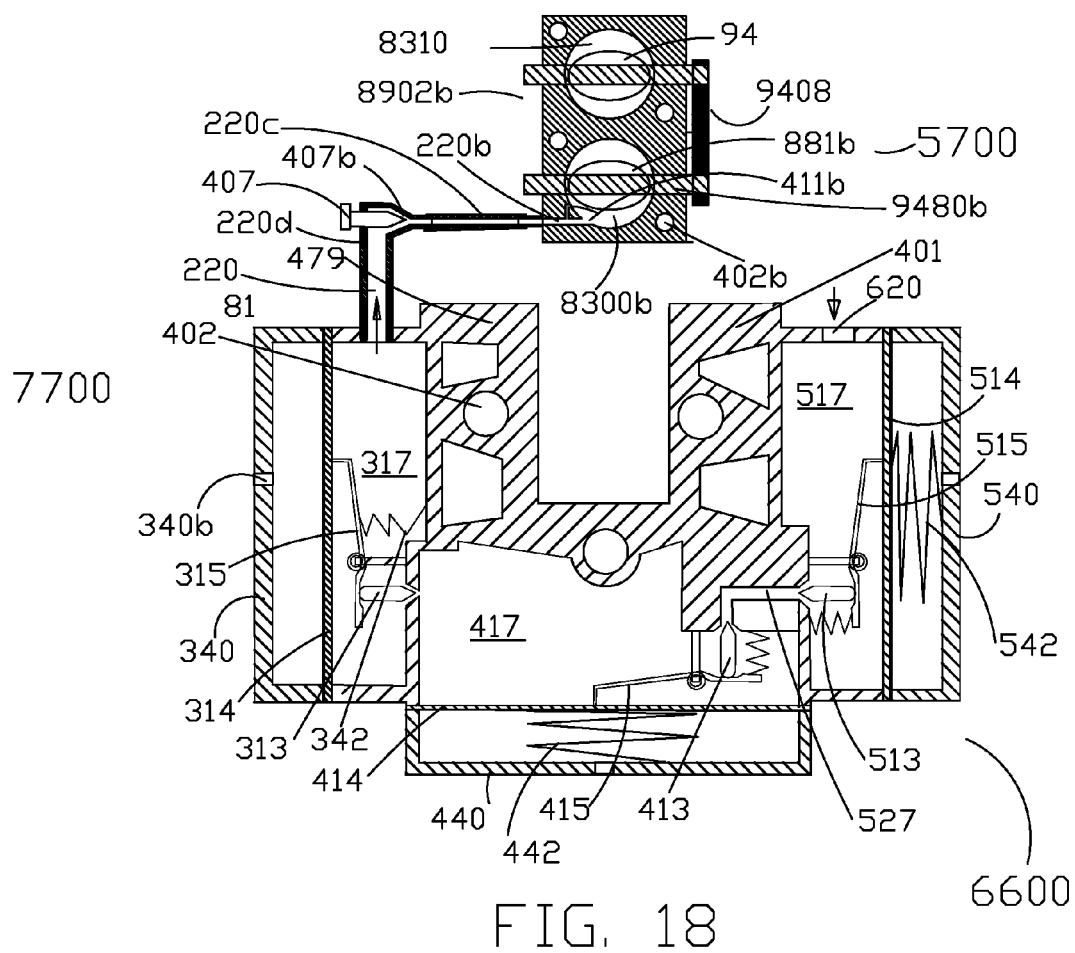
FIG. 18 shows a multi-valved throttle body 5700 receiving fuel from a separate multi-stage pressure regulator 6600.

FIG. 18 shows a system 7000 having a pressure regulating system 6600 and a separate dual passage for air only and air-fuel (or fuel only) metering system 5700. The system 5700 has two separate valves 94 and 881b in a single body 8902b (or could be separate bodies, not shown) to regulate the air and air-fuel respectively. The systems 600 and 5700 are mounted separately to isolate any kind of vibration and heat or can be attached to each other as convenient. Again, the fuel supply from the pressure regulating body 6000 to the system 5700 is through a flexible fuel supply line 200c and the fuel supply has a rich fuel adjusting screw 407. The body 8902b has internal fuel passage 220b and at least one orifice 411b in the venture 8300b. The valve 94 for controlling the air and valve 881b for controlling air-fuel (or fuel only) are linked to each other so they are operated simultaneously (with some delay in opening the air-only valve, as necessary). It must be noted that the flow controlling valves may be a combination of any type of valves; rotary, butterfly, or sliding (barrel) valves. They may be interlinked directly or indirectly through linkages or cables, or gears. They could even be mounted on a common shaft as shown in FIG. 2 and FIG. 9. The inter connecting passages between the chambers in a multi-stage (chambered) pressure regulating system shown in the embodiments disclosed here are only an example and may be inter connected through external pipes as well. Also, the pressure regulating springs, example 542 may be inside the body 401, while the arm 515, needle 527 may be on the chamber cover 540. Also, the pressure regulating spring 542 may have a pressure adjusting screw to set the pressure, which is a common practice in any pressure regulating devices, commonly used in welding gases.

Another embodiment of this disclosure is that the pressure regulating system with or without the controlling valves, can be made of moldable material, such as delrin, which is cost effective to manufacture the body. Also, in order to improve the sealing between the needle 513 and the seat in the body, metal of appropriate material can be inserted later or insert molded for integrity. The needle, when long enough to be guided inside the valve seat, may account for any deformation due to heat of molding error. Another advantage of having a remote or separate pressure regulating body is that the body 401 can be integrally cast with the engine block or the crankcase 28 in an engine, while the flow regulating valves can be attached to the intake port/passages of an engine.

Figure 19:
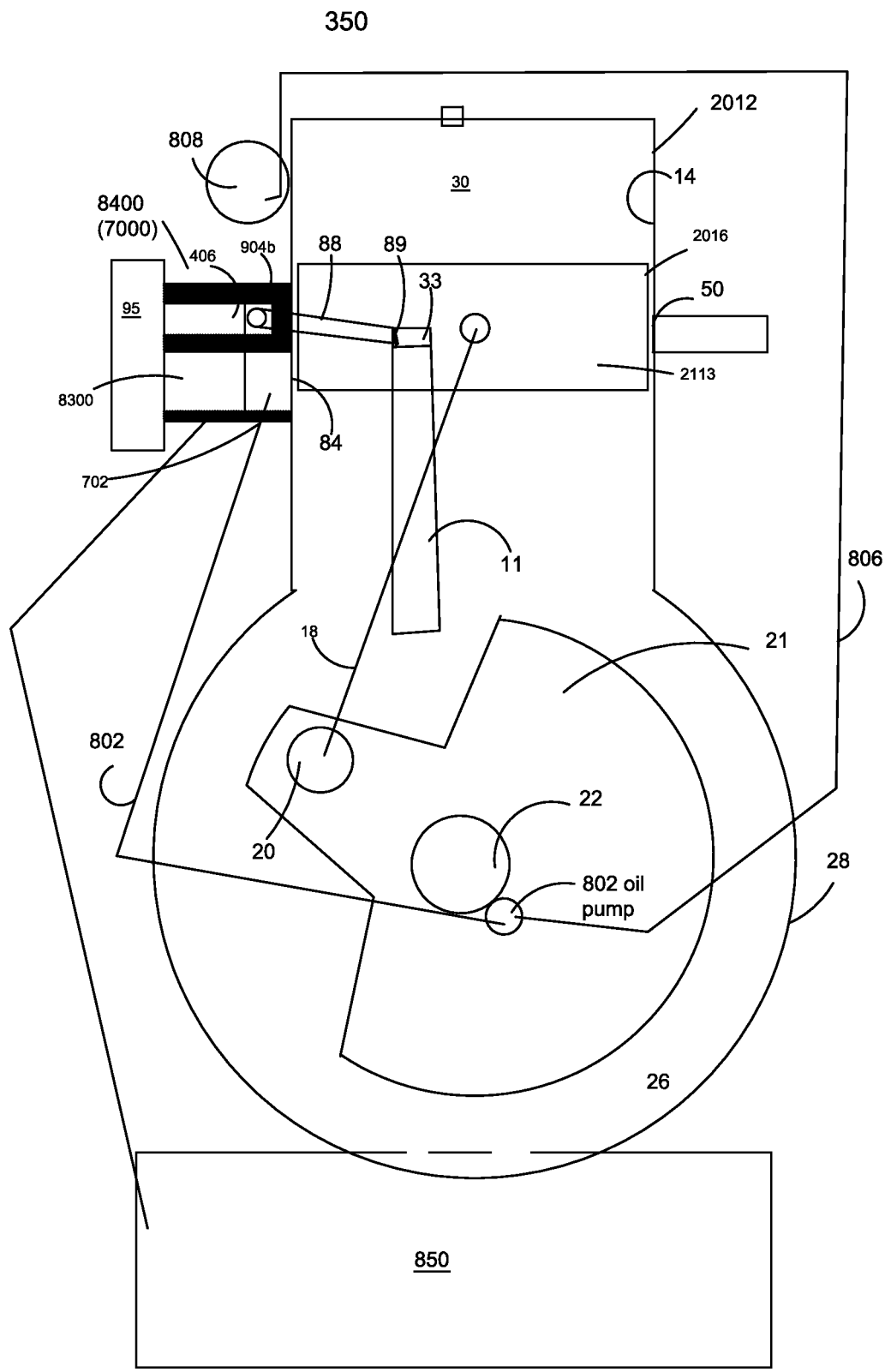
FIG. 19 shows an air-head stratified two-stroke engine 350, having reed valve (one-way valve) at the top of the transfer passage.

FIG. 19 shows an air-head stratified engine 350 having air pipe 88 for supply of air from atmosphere into the transfer passages 11 through the reed valve (check valve or one-way valve). The air pipe is connected to the manifold 904b having which is connected to the carburetor 8400 (7000), which has an air throttle body for regulating the air. As the piston 2316 moves upward, it closes the exhaust port 50 and then the transfer port 33. Further upward stroke creates more vacuum forcing the check valve 89 to open and thus drawing atmospheric air into the transfer passage 11. Further upward stroke of the piston 2016 causes the piston skirt 2113 to uncover the intake port 84 to open and thus air-fuel mixture is drawn into the crankcase. The oil may be injected into the intake passage 8300 for lubricating the internal parts of the engine. The oil pump 802 is driven by the crankshaft 22. The operating principle of the air-head or the stratified engine is similar to the one described in prior arts. As the piston starts to move downward, the pressure in the crankcase chamber 26 exceeds the atmospheric pressure or the pressure in the manifold, thus forcing the reed valve 89 to close. Further downward stroke of the piston 2016 closes the intake port 84. Thus the crankcase pressure increases. As the piston continues the downward stroke, it uncovers the exhaust port 50 first and followed by the transfer ports 33. As the crankcase pressure is higher than the combustion chamber pressure, past the blow down phase, the air in the transfer passage 11 enters the combustion chamber first, followed by the air-fuel mixture. Thus the air that enters first is the one that gets short circuited and therefore emission is lower and fuel consumption is better than a conventional engine. Oil is injected in a non-pre-mixed fuel or in a gaseous fueled two-stroke engine.

Figure 21:
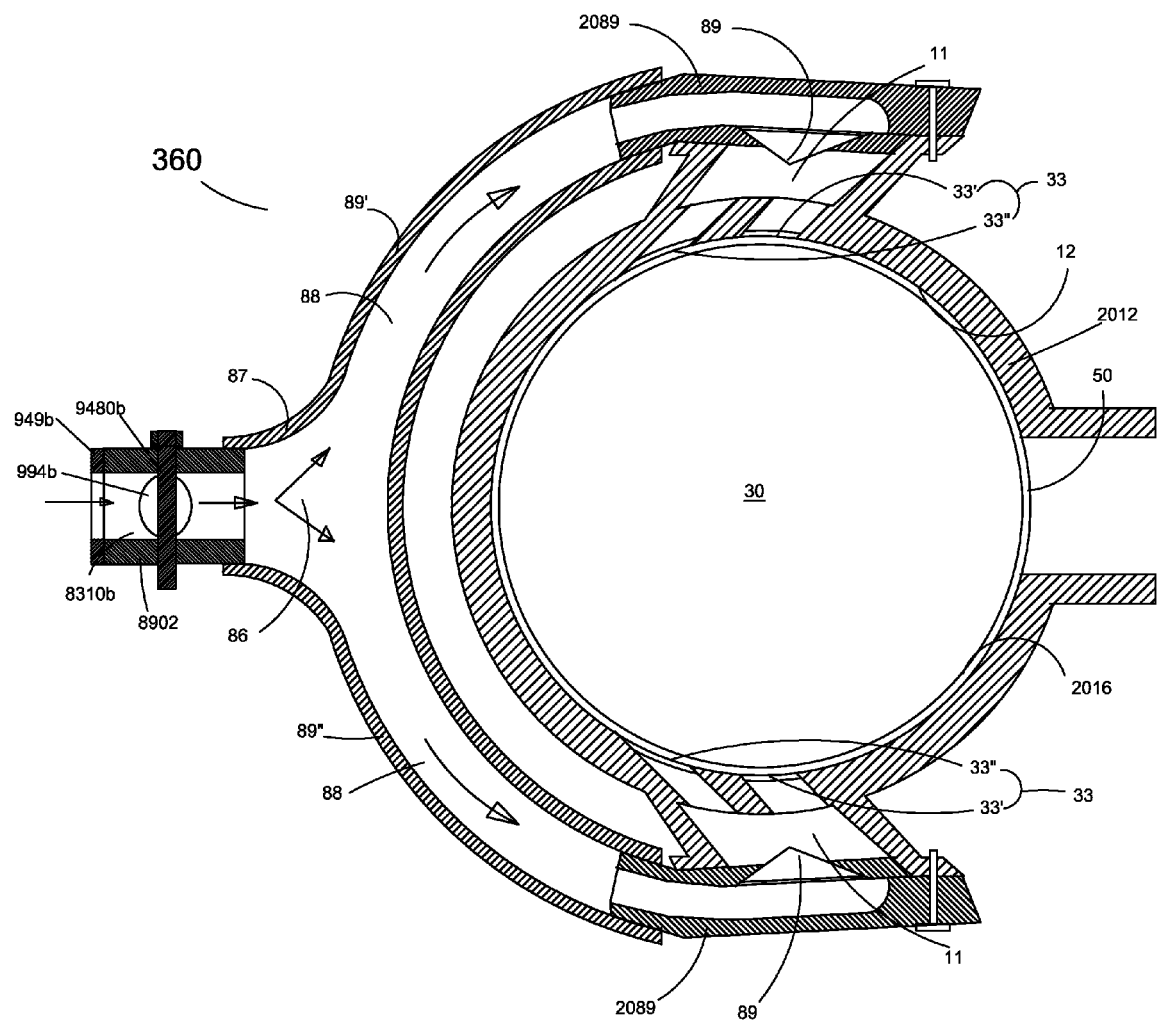
FIG. 21 shows cross sectional view of the engine 360 having a single piece U shaped air pipe 87.

Engine 360 shown in FIG. 20 is identical to the engine 350 shown in FIG. 19, except that the intake manifold (or sometimes called heat dam) is different. In FIG. 20, the manifold 904c is similar to the one used in a conventional two-stroke engines, unlike the one disclosed in prior art U.S. Pat. No. 6,112,708. That is, the manifold has only one passage for the air-fuel mixture. However, in this embodiment, the air pipe 88 is directly connected to the air-throttle body 8902 either having dual exit, as shown in FIG. 9c and FIG. 10b. Alternatively the air throttle body may have a single exit air passage 8310b as shown in FIG. 10, while the air pipe 87 will be a single piece pipe having a common inlet at 86 and diverging into two separate pipes 89' and 89" to supply air into transfer passages 11 on either side of the exhaust port 50 as shown in FIG. 21. The air-head stratified engine 350 shown in FIG. 21 shows the reed assembly 2089 and reed valve 89. The reed assembly is connected to the air pipe 87 and the common inlet at 86 is connected to the single exit air throttle body 8902.

In various embodiments, pipe 87 is a single U-shaped unit. The pipe may receive inflow at the base of the 'U', and such flow may then branch off at 86 into the two sides of the 'U' at 88. Embodiments where pipe 87 is a single unit provide advantages in construction and complexity over alternatives that would involve two or more separate components to accomplish the same function.

In various embodiments, pipe 87 has a generally rounded construction. Thus, flows are not required to turn around sharp corners, and smoother flow progression is accomplished.

The following are embodiments, not claims:

A. A gaseous fueled dual passage carburetor 400 comprising:
  a. a lean passage 310;
  b. a lean valve 80;
  c. a rich charge passage 300;
  d. a rich valve 81;
  e. at least one pressure regulating chamber with a diaphragm, spring, and a needle valve;
  f. a first fuel passage 320 leading into the lean passage 310; a second fuel passage 220 leading into the rich charge passage 300;
  g. a fuel tank (850);
  h. a gaseous fuel inlet (620) receiving fuel from the fuel tank (850);
  i. a venture (406);
  j. a first fuel orifice (410) in the venture (406); and
  k. a second fuel orifice (411) in the rich charge passage (300).
B. The carburetor (400) of embodiment A in which the both the lean valve 80 and rich valve 81 are control valves.
C. The carburetor (400) of embodiment B in which control valves 80 and 81 are on one shaft (479).
D. The carburetor (400) of embodiment C in which control valves 80 and 81 are each butterfly valves, and are each cut out on the shaft (479).
E. The carburetor (400) of embodiment A in which the both the lean valve 80 and rich valve 81 are rotary valves.
F. The carburetor (400) of embodiment A in which the lean valve 80 is a butterfly valve and the rich valve 81 is a rotary valve.
G. The carburetor (400) of embodiment A further including three mounting holes 402, 403, and 404.
H. The carburetor 400 of embodiment A, in which the carburetor is embedded within an engine, the engine including a crankshaft 106, an attached LPG or Butane fuel tank, and a separate oil tank 140 shaped such as to access oil at all engine attitudes, the carburetor 400 further comprising:
  a. an oil injector 702 for injecting oil into the passage 310; and
  b. an oil injection pump 138 driven by the crankshaft 106.
I. The carburetor (400) of embodiment A further comprising an internal combustion engine.
J. A gaseous fueled two-stroke engine 100 having a gaseous carburetor 400 with an oil injection pump 138 driven by a crankshaft 106 with an LPG or Butane fuel tank attached to the engine and a separate oil tank 140 shaped such as to access oil at all engine attitudes.
K. The engine of embodiment 10 having a cylindrical fuel tank.
L. The engine 200 of embodiment 10 having at least one air inlet port 98, at least one air channel 96, at least one first piston port 99, at least one second piston port 99, a transfer passage 11, a transfer port 33, an exhaust port 50, and a piston 2016 reciprocating in the cylinder 2012.
M. An internal combustion engine comprising:
  i. a cylinder (12);
  ii. a cylinder bore (14);
  iii. a crankshaft (22);
  iv. a piston (16) connected to the crankshaft (22) having a counter weight (21);
  v. a crankcase chamber (26);
  vi. a combustion chamber (30);
  vii. at least one injection port (40) intermittently open to the combustion chamber (30);
  viii. an injection tube (38) intermittently filled with gaseous fuel, and intermittently connected to the crankcase chamber (26);
  ix. a oil injection pump (802) driven by the crankshaft (22);
  x. a oil tank (140);
  xi. at least one intake port (84);

xii. at least one exhaust port (50); and
xiii. an oil injector (702),
xiv. in which the gaseous fuel is significantly free of oil.

N. The engine of embodiment M further comprising an injection tube (38) intermittently filled with air and fuel.

O. The engine of embodiment M in which the injection tube (38) is intermittently filled with fuel only.

P. The engine of embodiment M, in which the piston makes repeated cycles, and in which, on each cycle the injection tube (38) is filled with gaseous fuel only, which is added to residual gas remaining from a previous cycle.

Q. The engine of embodiment M further comprising an intake port (84) intermittently supplying only air into crankcase chamber (26).

R. The engine of embodiment M in which oil is injected into intake air.

S. The engine of embodiment M in which oil is injected into air-fuel mixture.

T. The engine of embodiment M, further comprising a transfer passage, in which oil is injected into the transfer passage.

U. The engine of embodiment M in which oil is injected into crankcase chamber (26) through a passage in crankshaft (22).

V. The engine of embodiment M further comprising a heat dam (904) in which oil is injected into the heat dam (904).

W. An internal combustion two-stroke engine (200) comprising:
  i. a cylinder (2012) and a cylinder bore (14);
  ii. a crankshaft (22) having a counter weight (21);
  iii. a piston (2016) connected to the crankshaft (22),
  iv. in which the piston has a piston skirt (2113) and at least one air channel (96) on the piston skirt (2113);
  v. at least one first port (99) and at least one second port (101), the first and second ports intermittently aligning with at least one air inlet port 98 and at least one transfer port 33, respectively;
  vi. a crankcase chamber (26),
  vii. an oil injection pump (802) driven by the crankshaft (22);
  viii. an oil tank (140);
  ix. at least one exhaust port (50);
  x. an oil injector (702);
  xi. at least one intake port (84), in which a gaseous fuel is inducted through intake port (84) and oil is injected into crankcase chamber 26 through intake port 84;
  xii. and a dual passage gaseous carburetor (8400).

X. The engine of embodiment W further comprising a gaseous fuel tank (850).

Y. The engine of embodiment W in which the oil tank is separated from the engine.

Z. An internal combustion engine comprising:
  i. a cylinder (2012) and a cylinder bore (14);
  ii. a crankshaft (22) having a counter weight (21);
  iii. a piston (2016) connected to the crankshaft (22),
  iv. in which the piston (2016) has at least one air channel (96) on the piston skirt (2113);
  v. at least one air inlet port (98);
  vi. at least one transfer port (33);
  vii. at least one first port (99) and at least one second port (101), in which the first and second ports intermittently align with the at least one air inlet port (98) and the at least one transfer port (33), respectively;
  viii. a crankcase chamber (26) receiving intermittent injections of oil;
  ix. a combustion chamber (30);
  x. at least one injection port (40) intermittently open to the combustion chamber (30);
  xi. a injection tube (38), the injection tube (38) intermittently filled with gaseous fuel that is significantly free of oil; and intermittently connected to the crankcase chamber (26);
  xii. an oil injection pump (802) driven by the crankshaft (22);
  xiii. an oil tank (140);
  xiv. at least one first piston port (99);
  xv. at least one second port (101); and
  xvi. at least one exhaust port (50).

AA. A gaseous fueled carburetor comprising:
  a. at least one pressure regulator;
  b. at least one metering chamber;
  c. a first valve for air-fuel regulation;
  d. a second valve for air only; and
  e. a linkage between the two valves.

BB. The carburetor of embodiment AA in which the first valve is a rotary valve and the second valve is a butterfly valve.

CC. The carburetor of embodiment AA in which the first valve is a butterfly valve and the second valve is a rotary valve.

DD. A gaseous fueled dual passage carburetor 8400 comprising:
  a. an air passage 8310 and air-fuel passage 8300, with each passage controlled by respective control valves 94 and 881;
  b. at least one pressure regulating chamber which includes a diaphragm, spring, and needle valve;
  c. a fuel metering chamber 317 operable to supply fuel into the air-fuel passage 8300 at sub atmospheric pressure.

EE. A gaseous fueled carburetor 8900 having:
  a barrel valve 81 for regulating the air-fuel mixture;
  at least one butter fly valve 994*b* for regulating the air,
  butterfly valve 99*b* and barrel valve 81 inter connected by means of a linkage 9408*b*, having at least one pressure regulating chamber 517,
  at least one metering chamber 317

FF. A gaseous fueled carburetor 8900 having:
  a barrel valve 81 for regulating the air-fuel mixture;
  at least one butter fly valve 994*b* for regulating the air,
  butterfly valve 99*b* and barrel valve 81 inter connected by means of a linkage 9408*b*, having at least one pressure regulating chamber 517,
  at least one metering chamber 317,
  barrel valve body having at least one mounting hole 402 (and 403), and;
  butterfly valve body 8901 having at least one mounting hole 404.

GG. A stratified engine having a check valve at the top of the transfer passage and having single air pipe 87 diverging into two air pipes 89' and 89" to supply air from a single exit air throttle body 8902 to the transfer passages 11. Engine 360 having a simple manifold (heat dam) commonly used with catalyzed two-stroke engine and not being a stratified engine. Carburetor being either a gaseous fuel or liquid fuel.

HH. A dual passage (gaseous or liquid) carburetor for a stratified engine having a air throttle body 8902 having dual exits for supply of air to the transfer passages 11 located on either sides of the exhaust port 50.

Various embodiments include a carburetor that advantageously has a built-in pressure regulating chamber, because fuel supplied to carburetor is already under pressure. Various embodiments utilize a fuel compressing liquefied petroleum gas. In some embodiments, the fuel could be natural gas, hydrogen gas, or any type of fuel essentially free of oil.

Parts List
100 Engine
11 transfer passage
12 Cylinder
14 cylinder wall
16 Piston
18 connecting rod
20 crank pin
22 Crankshaft
26 crankcase chamber
28 Crankcase
30 Combustion chamber
33 transfer port (33' and 33" in a quadruplet port)
36 One way valve
38 Injection tube
40 charge injection port
50 Exhaust port
80 Lean valve
81 Rich valve
84 Intake port
88 Left and right air pipes
87 Air pipe
95 Air-filter box
8902 Air throttle body
101 Piston pin
220 Rich fuel passage
220b Fuel passage
220c Fuel tube
300 Rich charge passage
310 Lean passage
313 Metering needle valve
314 Metering diaphragm
315 Metering arm
317 Metering chamber
320 Lean fuel passage
340 Metering chamber cover
342 Metering chamber spring
400 Gaseous fuel carburetor
402 Mounting hole
403 Mounting hole
404 Mounting hole
406 venture
407 Rich fuel adjusting screw
408 Lean fuel adjusting screw
408 Throttle lever
410 Lean orifice
411 Rich orifice
413 Low pressure needle valve
414 Low pressure diaphragm
415 Low pressure arm
417 Low pressure chamber
440 Low pressure cover
442 Low pressure chamber spring
479 Throttle shaft
513 Hi pressure needle valve
514 High pressure diaphragm
515 High pressure arm
517 High pressure chamber
520 High pressure fuel passage
540 High pressure cover
542 High pressure chamber spring
620 Fuel inlet
702 Oil injector
802 oil outlet tube
804 oil pump
806 oil inlet tube
808 oil tank
850 Gaseous fuel tank
902 Heat dam
200 Engine
94 Air valve
96 air channel
98 Air inlet port
99 first piston port
101 second piston port
406 and 404b Air passage
881 Air-fuel valve
904 Heat dam
2012 Cylinder
2016 Piston
2113 piston skirt
8300 Air-fuel passage
8310 Air passage
8320 Fuel passage
8400 Dual passage gaseous Carburetor
8901, 8902, 8902b Throttle body detachable from pressure regulator
8910 Carburetor
8920 Carburetor
9000 Dual passage gaseous fuel carburetor having pressure regulator and air only throttle valve in the main body 403
8990 Dual passage rotary valve gaseous carburetor having a detachable upper air valve body 801c
801 C Air only throttle body having two outlets
8310c and 8310d Dual air outlets
87 Single piece air pipe
89' left air pipe
89" right air pipe
2089 Reed valve assembly
150 Rotary Valve Stratified Gaseous fueled two-stroke engine
21 Crank web
39 Injection passage
41 Crankcase port
44 Annular slot 1
45 Annular slot 2
88 Air pipe
89 Reed valve (one way valve)
6600 Pressure regulating system
5000 Fuel regulating system
7000 Fuel system
5700 Dual passage metering system
881b Air-fuel (or fuel only) regulating valve
94 Air controlling valve
881c Air-fuel regulating valve
401b Pressure regulating body
220 Fuel passage (fuel line)
9407 Fuel needle It is to be understood that other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gaseous fueled dual passage carburetor comprising:
a main throttle body;
a secondary throttle body
a lean passage;
a lean valve;
a rich charge passage;

a rich valve;
at least one pressure regulating chamber with a diaphragm, spring, and needle valve;
at least one fuel metering chamber with a diaphragm, spring, and needle valve;
a first fuel passage leading into the lean passage;
a second fuel passage leading into the rich charge passage;
at least one fuel tube connecting the at least one fuel meter chamber to at least one fuel orifice in the secondary throttle body
a fuel inlet receiving fuel from at least one fuel tank
a venture;
a first fuel orifice in the venture; and
a second fuel orifice in the rich charge passage.

2. The carburetor of claim 1 in which the fuel is substantially free of any oil.

3. The carburetor of claim 1 in which the fuel is a gaseous fuel including one of:
(a) LPG; (b) Butane; and (c) Natural gas.

4. A gaseous fueled dual passage carburetor comprising:
a main throttle body;
a secondary throttle body
at least one fuel orifice in the secondary throttle body;
an air only passage in the main throttle body;
an air only valve;
a rich charge passage;
a rich valve;
at least one pressure regulating chamber with a diaphragm, spring, and a needle valve;
a fuel metering chamber;
at least one fuel passage connecting fuel metering chamber to the at least one fuel orifice in the secondary throttle body
a fuel adjusting screw in the fuel passage;
at least one fuel tank;
a fuel inlet receiving gaseous fuel from the at least one fuel tank; and
at least one fuel orifice in the rich charge passage.

5. The carburetor of claim 4 in which the fuel is substantially free of any oil.

6. The carburetor of claim 4 in which the fuel is a gaseous fuel including one of:
(a) LPG; (b) Butane; and (c) Natural gas.

7. An engine comprising:
a crank web;
a crankshaft having rotary shut off valve on crank web;
an injection tube;
an injection port;
a crankcase or main body;
a crankcase chamber;
a crankcase port at the bottom of injection tube opening into the crankcase chamber, in which crankcase port is opened and closed by annular slots 44 and 45 on the crank web;
an engine housing;
at least one LPG or Butane fuel tank attached to the engine (or housing);
an oil tank shaped such as to access oil at all engine attitudes;
a passage;
an oil injector for injecting oil into the passage;
an oil injection pump driven by the crankshaft; and
a gaseous fuel carburetor, in which the carburetor comprises:
at least one pressure regulating chamber;
at least one fuel metering chamber; and
a gaseous fuel inlet.

8. The engine of claim 7 further comprising:
a combustion chamber;
two transfer passages connecting the crankcase chamber to the combustion chamber;
a U-shaped pipe with a first port at the base of the U for receiving gas from the carburetor, and second and third ports at the respective tips of the U, said second and third ports for delivering air to the respective transfer passages.

9. An engine comprising:
a crank web;
a crankshaft having rotary shut off valve on crank web;
a crankcase;
a crankcase chamber;
at least one LPG or Butane fuel tank attached to the crankcase;
an oil tank shaped such as to access oil at all engine attitudes, the oil tank separate from the crankcase;
an injection tube;
an injection port;
a crankcase port at the bottom of injection tube opening into the crankcase chamber, in which crankcase port is opened and closed by annular slots and on the crank web; and
the carburetor of claim 1 embedded within the engine.

10. A gaseous fueled stratified engine including:
a housing;
a crankshaft;
at least one LPG or Butane fuel tank within the engine housing;
an oil tank;
an intake port;
at least one air pipe with at least one one-way valve at the end of the air pipe;
the carburetor of claim 4 embedded within the engine, said carburetor further comprising:
at least one pressure regulating chamber;
at least one fuel metering chamber; and
a gaseous fuel inlet;
a passage;
an oil injector for injecting oil into the passage;
an oil injection pump driven by the crankshaft; and
at least one transfer passage having at least one transfer port, in which the at least one transfer passage is intermittently connected to ambient air through the at least one air pipe and through the at least one one-way valve,
in which the at least one air pipe connects the carburetor to the top of transfer passage.

11. A gaseous fueled stratified engine including:
a housing;
a crankshaft;
at least one LPG or Butane fuel tank within the engine housing;
an oil tank;
an intake port;
at least one air pipe with at least one one-way valve at the end of the air pipe;
the carburetor of claim 4 embedded within the engine, said carburetor delivering an air-fuel with oil mist for lubricating the engine; and
at least one transfer passage having at least one transfer port,
in which the at least one transfer passage is intermittently connected to ambient air through the at least one air pipe and through the at least one one-way valve, and
in which the at least one air pipe connects the carburetor to the top of transfer passage.

12. A gaseous fueled carburetor as claimed in claim 4 further having:
a carburetor (8400) (7000) (8900) delivering either a gaseous fuel or liquid fuel;
a fuel throttle body (479);
air throttle body (8902); and
throttle valves (81) and (994*b*), the two throttle valves connected to one another through a link,
in which fuel throttle body (479) and air throttle body (8902) are two separate bodies and are attached through a plate (9408*b*).

13. A dual passage (gaseous or liquid) carburetor (8990) (8900) having a detachable air throttle body (801*c* )having dual air-only outlets (8310*c* and 8310*d*), in which the carburetor can be connected to an engine with transfer passages, and supply air to the transfer passages via the dual air-only outlets.

14. An internal combustion engine comprising:
a cylinder (12);
a cylinder bore (14);
a crankshaft (22);
a piston (16) connected to the crankshaft (22) having a counter weight (21);
a crankcase chamber (26);
a combustion chamber (30);
at least one injection port (40) intermittently open to the combustion chamber (30);
an injection tube (38) intermittently filled with gaseous fuel, and intermittently connected to the crankcase chamber (26);
at least one intake port (84); and
at least one exhaust port,
in which the engine is mist lubricated through the intake port (84).

15. The engine of claim 14 further having at least one cylindrical fuel tank.

16. The engine of claim 14 in which oil enters the crankcase chamber with an air-fuel mixture.

17. An internal combustion engine comprising:
a cylinder;
a cylinder bore;
a crankshaft;
a piston connected to the crankshaft having a counter weight;
a crankcase chamber;
a combustion chamber;
at least one injection port intermittently open to the combustion chamber;
an injection tube intermittently filled with gaseous fuel, and intermittently connected to the crankcase chamber;
at least one intake port; and
at least one exhaust port,
in which the gaseous fuel is LPG or Butane.

18. An internal combustion engine comprising:
a cylinder and a cylinder bore;
a crankshaft having a counter weight;
a piston connected to the crankshaft,
in which the piston has at least one air channel on the piston skirt;
at least one air inlet port;
at least one transfer port;
at least one first port and at least one second port, in which the first and second ports intermittently align with the at least one air inlet port and the at least one transfer port, respectively;
a crankcase chamber;
a combustion chamber;
at least one injection port (40) intermittently open to the combustion chamber;
a injection tube (38), the injection tube intermittently filled with gaseous fuel and intermittently connected to the crankcase chamber;
at least one first piston port;
at least one second port; and
at least one exhaust port.

19. A gaseous fueled stratified engine including:
a housing;
a crankshaft;
at least one LPG or Butane fuel tank within the engine housing;
an intake port;
at least one air pipe with at least one one-way valve at the end of the air pipe, and
the carburetor of claim 4 embedded within the engine, said engine further comprising:
at least one transfer passage having at least one transfer port,
in which the at least one transfer passage is intermittently connected to ambient air through the at least one air pipe and through the at least one one-way valve,
in which the at least one air pipe connects the carburetor to the top of transfer passage.

20. The engine of claim 19, in which the carburetor further comprises:
at least one pressure regulating chamber, having a needle valve and a diaphragm;
a metering chamber with a needle valve and a diaphragm;
an air only passage and air only throttle valve (94);
a rich air-fuel passage, having a throttle valve (81); and
a lean air-fuel passage having a throttle valve (80).

21. The engine of claim 20 in which valves (94, 81, and 80) are rotary valves.

22. The engine of claim 20 in which valves (94, 81, and 80) are butterfly valves.

23. The engine of claim 20 in which valves (94, 81, and 80) are a combination of rotary and butterfly valves.

24. A carburetor comprising:
a body;
at least one pressure chamber;
a metering chamber;
a detached throttle valve body;
a fuel passage connecting the metering chamber to at least one fuel orifice in the detached throttle valve body;
an adjustable screw with a fuel passage between tapered seat and the fuel orifice;
a throttle valve to regulate air-fuel mixture;
a throttle lever; and
at least two mounting holes.

25. A carburetor as claimed in claim 24 having an air valve in the carburetor body and linked to the throttle valve (Shown in FIG. 16).

26. A carburetor as claimed in claimed in claim 24 having the air throttle valve and the throttle valve in a detached throttle body detached from the carburetor body (Shown in FIG. 18).

* * * * *